(12) United States Patent
Laborde et al.

(10) Patent No.: US 7,191,184 B2
(45) Date of Patent: *Mar. 13, 2007

(54) OPTIMIZED STORAGE FOR MEASUREMENT DATA

(75) Inventors: Guy Vachon Laborde, Austin, TX (US); David Mark Pierce, Austin, TX (US); Andreas Peter Haub, Aachen (DE); Stefan Romainczyk, Aachen (DE); Helmut J. Helpenstein, Aachen (DE)

(73) Assignee: National Instruments Corporation, Austin, TX (US)

( * ) Notice: Subject to any disclaimer, the term of this patent is extended or adjusted under 35 U.S.C. 154(b) by 573 days.

This patent is subject to a terminal disclaimer.

(21) Appl. No.: 10/137,723

(22) Filed: May 2, 2002

(65) Prior Publication Data

US 2003/0154192 A1 Aug. 14, 2003

Related U.S. Application Data

(60) Provisional application No. 60/288,297, filed on May 2, 2001.

(51) Int. Cl.
*G06F 17/00* (2006.01)
(52) U.S. Cl. .................. 707/101; 707/102; 707/103 R; 707/104.1
(58) Field of Classification Search ................ 707/102, 707/4, 204, 101, 103 R, 104.1; 702/12, 104, 702/123
See application file for complete search history.

(56) References Cited

U.S. PATENT DOCUMENTS

| 5,983,164 | A  | * | 11/1999 | Ocondi ......................... 702/12 |
| 6,032,159 | A  | * | 2/2000  | Rivlin ......................... 707/204 |
| 6,173,287 | B1 | * | 1/2001  | Eberman et al. ............ 707/102 |
| 6,263,330 | B1 | * | 7/2001  | Bessette ........................ 707/4 |
| 6,385,552 | B1 | * | 5/2002  | Snyder ....................... 702/123 |
| 6,542,841 | B1 | * | 4/2003  | Snyder ....................... 702/104 |
| 6,741,998 | B2 | * | 5/2004  | Ruth et al. .................. 707/102 |
| 6,934,766 | B1 | * | 8/2005  | Russell ....................... 709/246 |

OTHER PUBLICATIONS

National Instruments, DIAdem™ DATA, ASAM Data Navigator, 2001, 3 pages.
Dipl.-Ing. Thorsten Mayer, "Technical Data Management for the Software of National Instruments", Jan. 30, 2001, 13 pages.
DIAgraph article, Jan. 1998, 7 pages (in German).
A Stable Basis, New ASAM-conform DataCache, DIAgraph, Jan. 1998, p. 2 only (in English) (Translation of a portion of A3).

* cited by examiner

*Primary Examiner*—Thuy N. Pardo
(74) *Attorney, Agent, or Firm*—Meyertons Hood Kivlin Kowert & Goetzel, P.C.; Jeffrey C. Hood; Jason L. Burgess

(57) ABSTRACT

A system and method for storing measurements. Each measurement may include bulk data and attribute data. The bulk data and the attribute data may be stored using different storage mechanisms. In one embodiment, relational database technology may be used to store the attribute data. Relational database technology may facilitate querying or searching on the attribute data. The bulk data may be stored in a database specialized for storing bulk data.

26 Claims, 12 Drawing Sheets

OPTIMIZED STORAGE FOR MEASUREMENT DATA

PRIORITY CLAIM

This application claims benefit of priority of U.S. provisional application Ser. No. 60/288,297 titled "System and Method for Processing Self-Describing Measurement Data," filed May 2, 2001, whose inventors are Guy Vachon Laborde, David M. Pierce, Andreas Peter Haub, Stefan Romainczyk, and I. Helmut Helpenstein.

BACKGROUND OF THE INVENTION

1. Field of the Invention

The present invention relates generally to computer software. More particularly, the present invention relates to software for processing technical data, such as measurement data.

2. Description of the Relevant Art

Technical Data Management may include a large collection of functionality and operations performed by different applications and services in handling, processing and managing technical data from measurements, simulations, and other applications in the operations of an engineering or scientific enterprise, company or department. The operations include but are not limited to storing and retrieving technical data; exploring, searching and filtering datasets in a technical data depository for use in other applications; managing technical data, datasets, data bases and data depositories; selecting technical data for use by other people; importing and exporting from other systems not directly integrated into the TDM solution; and supporting network operations for all of these services. Technical data management is a very complex problem and no one product solves all of these requirements.

The field of Technical Data Management (TDM) may include computer-based tools for acquiring, storing, and retrieving measurement data in an efficient and accurate way. As used herein, measurement data may include data acquired by a test and measurement application, e.g., via test and measurement hardware, such as data acquisition (DAQ) hardware or other hardware.

In TDM, it may be useful to store meta-data which describes the measurement data. Current solutions have bundled the meta-data and the measurement data to provide self-describing measurement data. For example, the Open Data Services (ODS) standard of the Association for Standardization of Automation and Measuring Systems (ASAM) specifies details for representations of the measurement and description data is used in the automotive industry. ASAM-ODS generally defines a data model architecture (a method to describe the organization of data in a data source) and general methods to access data sources.

An ASAM-ODS server is a database-oriented implementation of ASAM-ODS data storage. Generally, relational databases serve as the basis for ASAM-ODS servers, but implementations on object-oriented databases also exist. The server provides data storage functionality to ASAM-ODS compliant clients. In addition, the server provides the ODS API (AOP¾ ASAM ODS Protocol version ¾) and stores data in such a way that the data can be handled in an ODS-compliant data model by a client through the API.

An ATF (ASAM Transport Format) file, an ASCII representation of the ASAM-ODS data and data model, facilitates the exchange of data between different ASAM-ODS storage systems or other external systems. Measurement data (bulk data) can also be stored in binary files and linked to the ATF file.

Existing solutions for storing self-describing measurement data may have several drawbacks. For example, in distributed computer systems having multiple networked computers, finding the location of the stored data may be troublesome. Furthermore, the data format(s) of the stored data may vary. Even where solutions to these problems exist, the solutions may require customized programming for each application that desires to access the stored data. The necessity for custom code results in a system that is expensive to develop, often difficult to maintain, often difficult to use, and not scalable.

Various TDM applications (such as those available from National Instruments Corporation) may be used to make measurements and then store them or fetch measurements for analysis and visualization. There are ways to store and retrieve data from each. Having one application store data in one place and another application obtain the data from the stored location is the core of current TDM systems. FIG. 1 (prior art) represents technical data management as performed today. Each application is independently responsible for storing and retrieving data.

The various TDM applications can read and write to similar storage mechanisms such as files or databases. This capability makes it possible to build TDM solutions, but it burdens the developer of the application acquiring the data and those developing the visualization and analysis applications with maintaining a consistent data representation. At the very least, this capability requires the various applications to share understanding of how the measurement is represented. This solution does not scale well to TDM applications in large corporations or communities. This solution imposes the burden and cost of coordination on all the applications.

Therefore, systems and methods for technical data management are desired to reduce the difficulty and complexity of using and building these TDM systems.

SUMMARY

One embodiment of the present invention comprises a system and method for storing measurements. Each measurement may include bulk data and attribute data. For example, the stored bulk data may include data acquired from data acquisition or other hardware devices. The stored attribute data may include a series of values that characterize the measurement. Applications may utilize the stored attribute values to later identify the measurement. For example, an application may search among a large number of measurements to identify measurements that have attributes meeting particular criteria. In various applications, the attributes may include any of various types of information, including information collected at the time the measurement is made. For example, attributes may specify the time and date of the measurement, the name of the person performing the test, the serial number of a unit under test, etc. Attributes may also include values derived from the measurement to be used for faster searching, such as the peak or RMS value. The attributes may also include a reference to other important datasets, such as calibration data.

The measurements may be structured according to a particular data model. The data model may define the set of attributes included in the measurements, their data types, relationships among data items in the measurements, etc.

Information describing the data model is called meta-data. The meta-data or data model gives meaning to the actual stored data by specifying what the data represents. An application or user unfamiliar with the data can apply the meta-data to properly interpret the data.

According to one embodiment of the method, the bulk data of a measurement and the attribute data of a measurement may be stored using different storage mechanisms. For example, the bulk data may be stored in a first data store and the attribute data may be stored in a second data store, where the first data store is a different type of data store than the second data store. Thus, instead of using a single technology to implement both bulk data and attribute data storage, optimal storage mechanisms may be used for each component of the measurement.

In one embodiment, relational database technology may be used to store the attribute data. Relational database technology may facilitate the type of searching described above performed on the attribute data. The bulk data may be stored in a database specialized for storing bulk data, such as the Citadel database described herein.

In one embodiment, the attribute data storage may be implemented through a table in a relational database. Each measurement may be represented by a row in the table. Each attribute may be stored in a separate column in the table with one column reserved for a pointer to the bulk data of the measurement. The bulk data may be stored in a file or in a database such as the Citadel database which is expressly designed to store bulk data.

BRIEF DESCRIPTION OF THE DRAWINGS

Other objects and advantages of the invention will become apparent upon reading the following detailed description and upon reference to the accompanying drawings in which.

Figure 1:
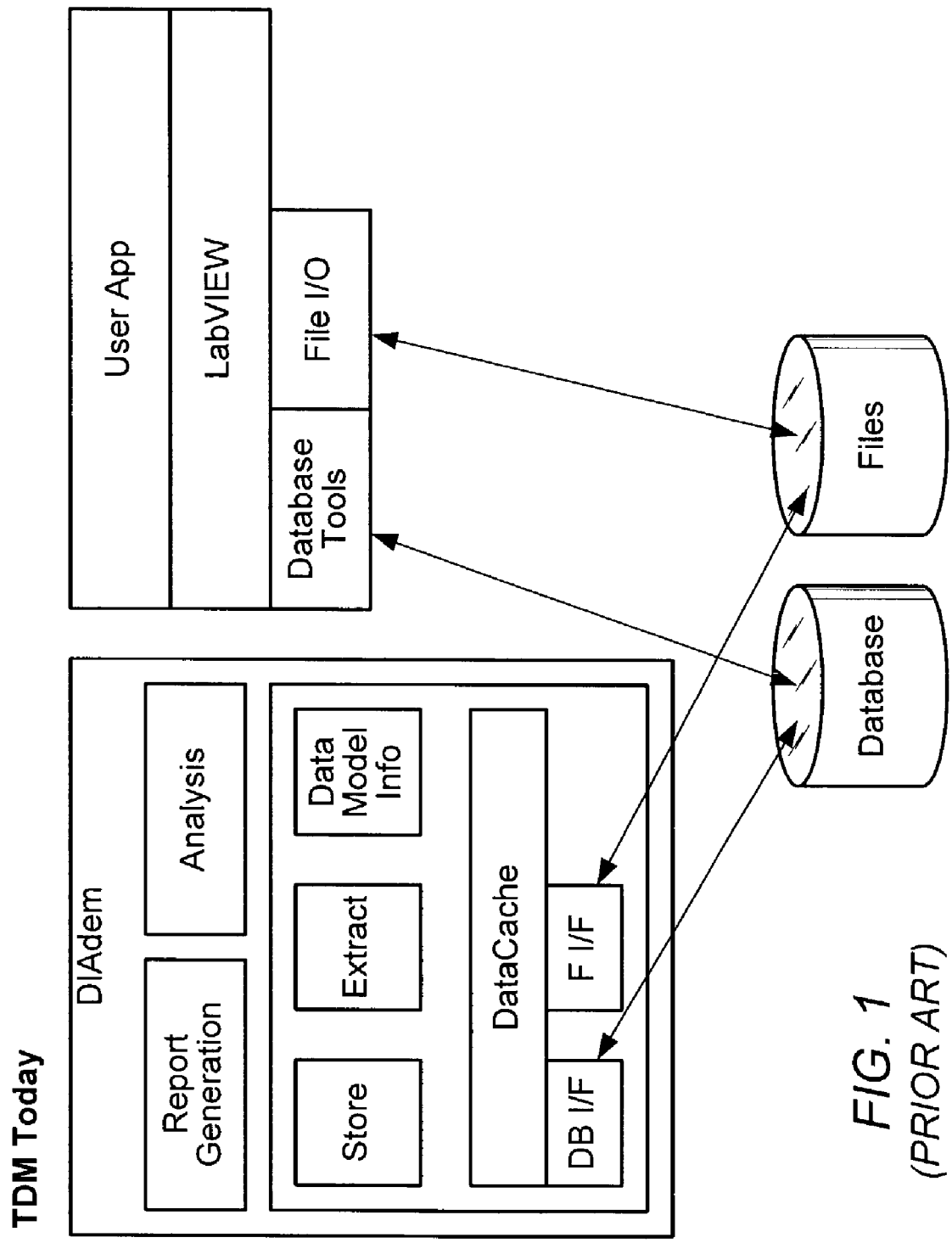
FIG. 1 (prior art) represents technical data management as performed today.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. provisional application Ser. No. 60/288,297 titled "System and Method for Processing Self-Describing Measurement Data," filed May 2, 2001, whose inventors are Guy Vachon Laborde, David M. Pierce, Andreas Peter Haub, Stefan Romainczyk, and I. Helmut Helpenstein.

Technical Data Management Framework—Overview

Figure 2:
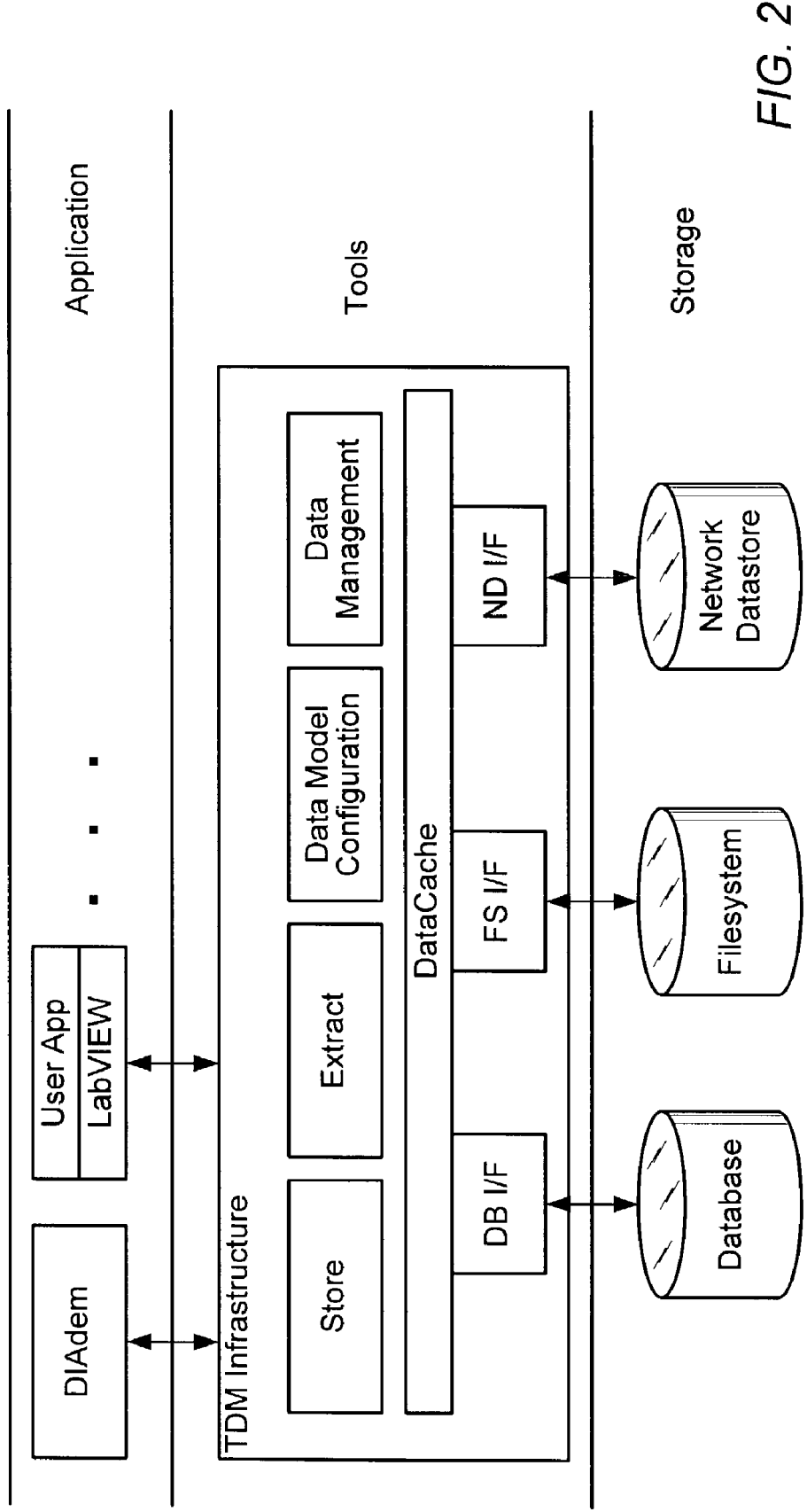
FIG. 2 illustrates a 3-tier Technical Data Management (TDM) model enabled by a Technical Data Management framework (TDM framework) disclosed herein.

FIG. 2 illustrates a 3-tier Technical Data Management (TDM) model enabled by a Technical Data Management framework (TDM framework) disclosed herein. The TDM framework may include various components for managing the storage and retrieval of technical data, such as measurement data. One or more of these components may be usable by client application programs, simplifying the task of storing technical data and sharing technical data among multiple applications. For example, consider an example application in which an organization performs tests on various devices, e.g., for quality control or R&D purposes. It may be necessary to run many tests and save the results in various types of database formats or other formats, such as plain files. Different applications may need to access the same technical data. For example, a first application may use data acquisition hardware to acquire waveform data from the devices, compute RMS and peak information from the data, and store the results. A second application may search for particular data sets that have been stored, perform further analysis on the data sets, and then re-store the data. The TDM framework described herein may simplify these kinds of technical data management tasks by utilizing data models and providing a common data retrieval and storage interface for applications to use to manage technical data.

Having various TDM applications share a common data retrieval and storage interface that can handle self-describing data does more than add capabilities to each. It makes it possible for the applications to work together to build TDM solutions that work well without requiring custom programming to make them compatible. When the data storage mechanism is common and self-describing, compatibility may be automatically enabled. This compatibility may be achieved by using a reusable component, such as the DataCache component described herein and making the notion of self-describing data understood throughout the various TDM applications, such as an acquisition application (which may create the data) and an analysis application (which may use and present the data).

The TDM framework may utilize a plug-in architecture for coupling to various types of storage mechanisms (data stores). For example, one or more plug-ins may provide access to various relational databases, another plug-in may provide access to an object-oriented database, another plug-in may provide access to a database specialized for storing bulk data (such as the Citadel database described herein), another plug-in may enable storage and retrieval of data in plain files, etc. The types of data stores supported by the TDM framework can be expanded as necessary by adding new plug-ins. In FIG. 2, the plug-in labeled "DB I/F" (i.e., "DB interface") represents a plug-in providing access to a database. In practice, there may be multiple database plug-ins for different kinds of databases. The plug-in labeled "FS I/F" represents a plug-in for storing/retrieving data in files. The plug-in labeled "ND I/F" represents a plug-in providing access to a data store located on a remote computer on a network.

As described above, the TDM framework may provide an interface to a component for storing and retrieving data, shown by the block labeled "DataCache" in FIG. 2. Applications, such as the Diadem and LabVIEW applications shown in FIG. 2, may utilize any of the storage mechanisms supported by the TDM framework simply by utilizing the provided DataCache interface. Also, as described below with reference to the USDI interface, there may also be one or more higher-level interfaces based on the DataCache interface which application programs may use to store/retrieve data. The interfaces provided by the TDM framework may allow for the storage and retrieval of data without regard to the storage mechanism. In other words, the TDM framework may hide differences in the various types of data stores and the complexity of the different access mechanisms from the user/application. The same access methods may be used no matter what data store actually stores the data.

The TDM framework may utilize data models to support the concept of self-describing measurement data. A data model may define a structure of data items, their attributes, and relationships between different data items. Information describing the data model is called meta-data. The meta-data or data model gives meaning to the actual stored data by specifying what the data represents. It is often useful to explicitly state and store the data model used by a particular application, especially in larger applications or where the data is used by multiple applications. An application or user unfamiliar with the data can apply the meta-data to properly interpret the data.

The TDM framework may enable users to define and use their own data models. The data model may be defined as part of building an application, and when the application is run, data may be written into the data store according to the data model. Data may be stored and retrieved without requiring code customized for a particular data model.

Defining a data model/meta-data may add meaning to measurement data stored in a particular data store. For example, if channel or trace data can be recognized as an entity that includes bulk waveform data, applications that use the channel or trace data can offer adapted methods to deal with this waveform data, e.g., to display it in a diagram. Meta-data may also make it easier to keep data consistent.

A data model architecture defines what makes up a valid data model. Valid data models are preferably defined according to the data model architecture. The architecture may define the pieces of a data model, and how the different pieces can be linked or joined into a data model.

In various embodiments, the data models utilized by the TDM framework may be implemented according to any of various data model architectures. According to one embodiment, the meta-data includes two parts, the base model and the application model, which is derived form the base model. The base model describes the basic elements of a data source or data store. It may also include elements to describe measurement data, administrative information, units, dimensions, and provisions for any application-specific data.

The application model is derived from the base model and describes the specific elements of the data model for a particular application. The base model serves as a general guideline for how application models in a group of applications should be setup. However, the application model defines the data model for each individual application.

The meta-data may be available whether or not the particular storage mechanism used to store the instance data natively supports meta-data. For example, the XML or ASAM-ODS standards natively support meta-data, whereas SQL does not. However, instance data stored using a SQL storage mechanism may still have associated meta-data managed by the TDM framework. In one embodiment, meta-data and instance data may be stored separately, but may appear to the user or client application to be stored as a single functional unit.

In one embodiment, the TDM framework may provide different interfaces for different types of clients or different interfaces providing lower-level or higher-level data management functionality. For example, an ASAM-ODS interface may be provided so that ODS-enabled applications can utilize the TDM framework. Another interface, referred to herein as a UDSA interface, may be provided for other kinds of applications, such as the LabVIEW graphical programming development environment or other application development environments.

As described in detail below, in one embodiment, the TDM framework may provide for certain portions of the technical data, e.g., bulk data such as waveform data, to be stored in a specialized database that allows optimal performance. (Storing waveform data in a relational database generally results in sub-optimal performance.) The TDM framework may also include various utilities to search, view, or analyze technical data. These utilities may utilize the underlying interfaces provided by the TDM framework.

The TDM framework may also provide a set of user interface components. Leveraging these user interface components may make it easier for different applications to utilize the TDM framework. Also, a set of common user interface components may enable the same look and feel across the different applications. The user interface components may also help the user in creating his own applications that utilize the TDM framework. Exemplary user interface components are described below.

Exemplary Uses

The following brief descriptions describe exemplary ways in which various applications may utilize the technical data management (TDM) framework to store/access technical data.

Example 1: A data acquisition application may utilize the TDM framework to store waveform or other bulk data. The waveform data may be streamed from the application to the TDM framework using a streaming interface. The TDM framework may store the waveform data in a database specialized for storing waveform/bulk data. In one embodiment, attribute data associated with the waveform data may be stored in a different database, e.g., a relational database.

Example 2: A graphical programming development environment may utilize the TDM framework to store and retrieve data associated with graphical programs. For example, the graphical programming development environment may store/retrieve front panel data using the TDM framework. The graphical programming development environment may also store/retrieve block diagram data using the TDM framework.

Example 3: A test executive software application may utilize the TDM framework to store execution results of test executive sequences, e.g., measurement data indicating results of executing various tests on a unit under test (UUT).

Example 4: A technical data analysis application may utilize the TDM framework to retrieve previously stored technical data. Meta-data stored with the instance data may be utilized by the analysis application to give a meaning to the instance data. After processing the data, the analysis application may utilize the TDM framework to re-store the technical data.

It is noted that these applications are exemplary only, and the TDM framework may be utilized by any of various other types of applications to manage technical data. Also, the TDM framework may serve as a common data storage/retrieval mechanism that integrates various applications. For example, the technical data analysis application in Example 4 may utilize the TDM framework to retrieve and analyze data previously stored by one of the other applications. By utilizing data models which provide meaning for the technical data, different applications can easily share the same data using a common data model.

Figure 3:
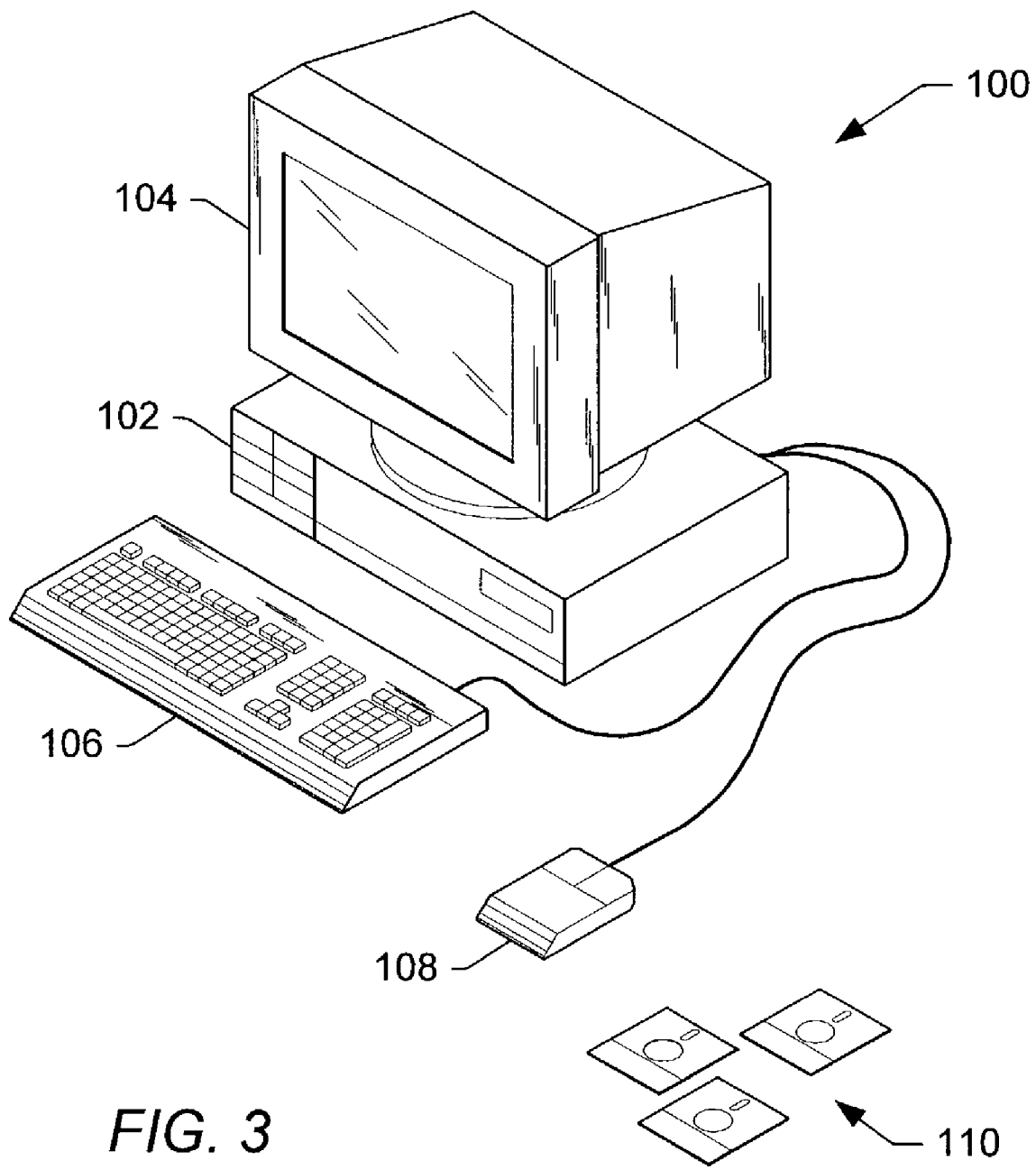
FIG. 3 illustrates a typical, general-purpose computer system 100 on which portions of the TDM framework may execute.

FIG. 3—A Typical Computer System

FIG. 3 illustrates a typical, general-purpose computer system 100 on which portions of the TDM framework may execute. The computer system 100 typically comprises components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. In various embodiments, the computer system 100 may comprise a desktop computer, a laptop computer, a palmtop computer, a network computer, a personal digital assistant (PDA), an embedded device, a smart phone, or any other suitable computing device.

According to one embodiment of the TDM Framework, components which may execute on the computer system 100 include: a DataCache DLL, a DataCache browser control, a UDSA (Unified Data Source Access) DLL, a DataCache server, DataCache plug-ins, a native database referred to as NI Store, and a specialized database referred to as Citadel. These components are described below. One or more of these components may execute on the computer system 100. Also, one or more of the components may be located on computers remotely located from the computer system 100 and connected via a network. The computer system 100 may also execute one or more client application programs that utilize components of the TDM framework, as described below.

Figure 4:
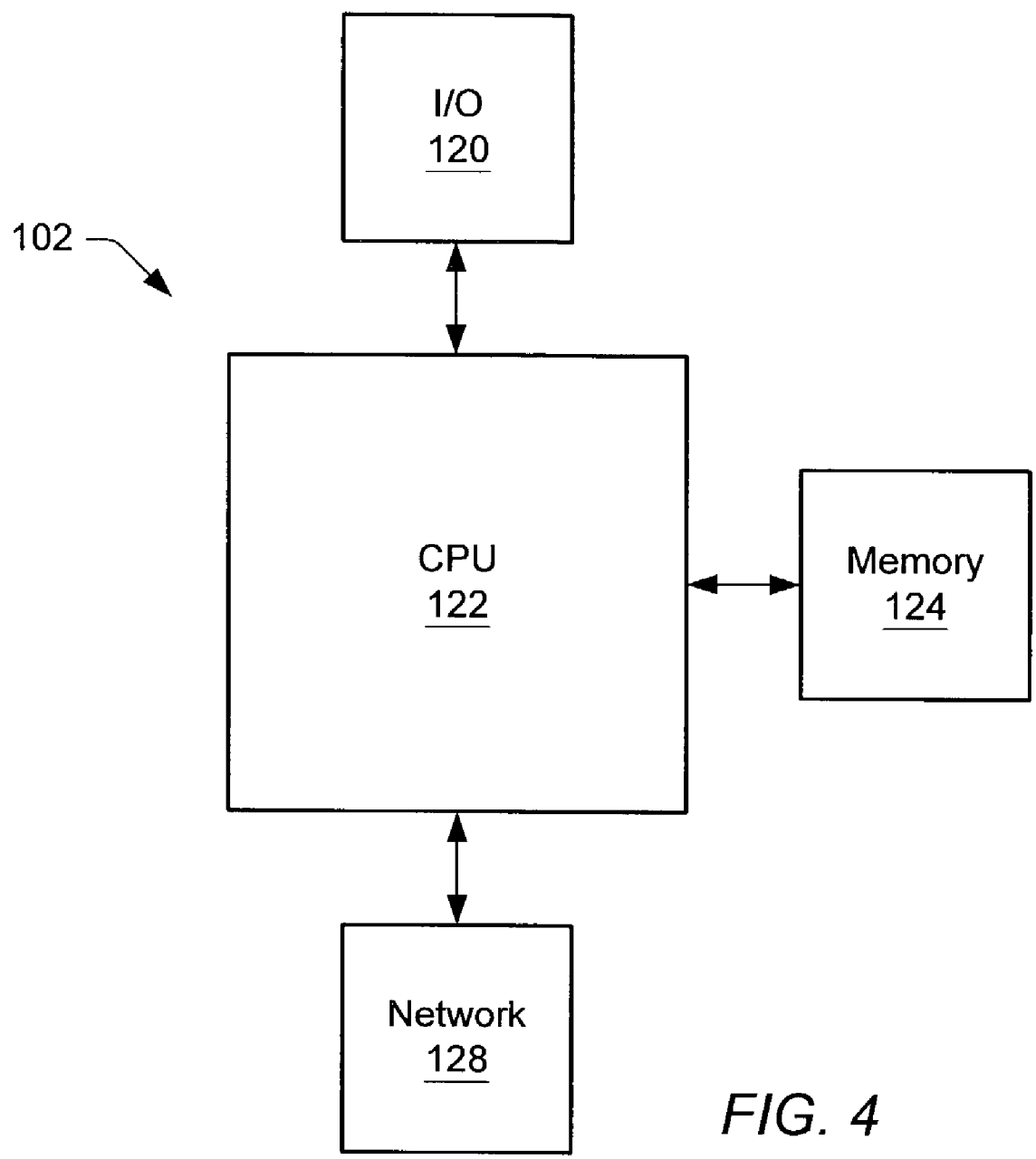
FIG. 4 is a block diagram illustrating the computing hardware 102 of a typical, general-purpose computer system 100 which is suitable for executing components of the TDM framework according to one embodiment.

FIG. 4—Computing Hardware of a Typical Computer System

FIG. 4 is a block diagram illustrating the computing hardware 102 of a typical, general-purpose computer system 100 which is suitable for executing components of the TDM framework according to one embodiment. The computing hardware 102 includes at least one central processing unit (CPU) or other processor(s) 122. The CPU 122 may be configured to execute program instructions which implement the system and methods described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the methods described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the TDM framework described herein through the input/output bus 120.

The CPU 122 may include a network interface device 128 for coupling to a network. The network may be representative of various types of possible networks: for example, a local area network (LAN), wide area network (WAN), or the Internet. The systems and methods as described herein may therefore be implemented on a plurality of heterogeneous or homogeneous networked computer systems such as computer system 100 through one or more networks. Each computer system 100 may acquire program instructions and/or data for implementing the system and method for self-describing measurement data as described herein over the network.

Figure 5:
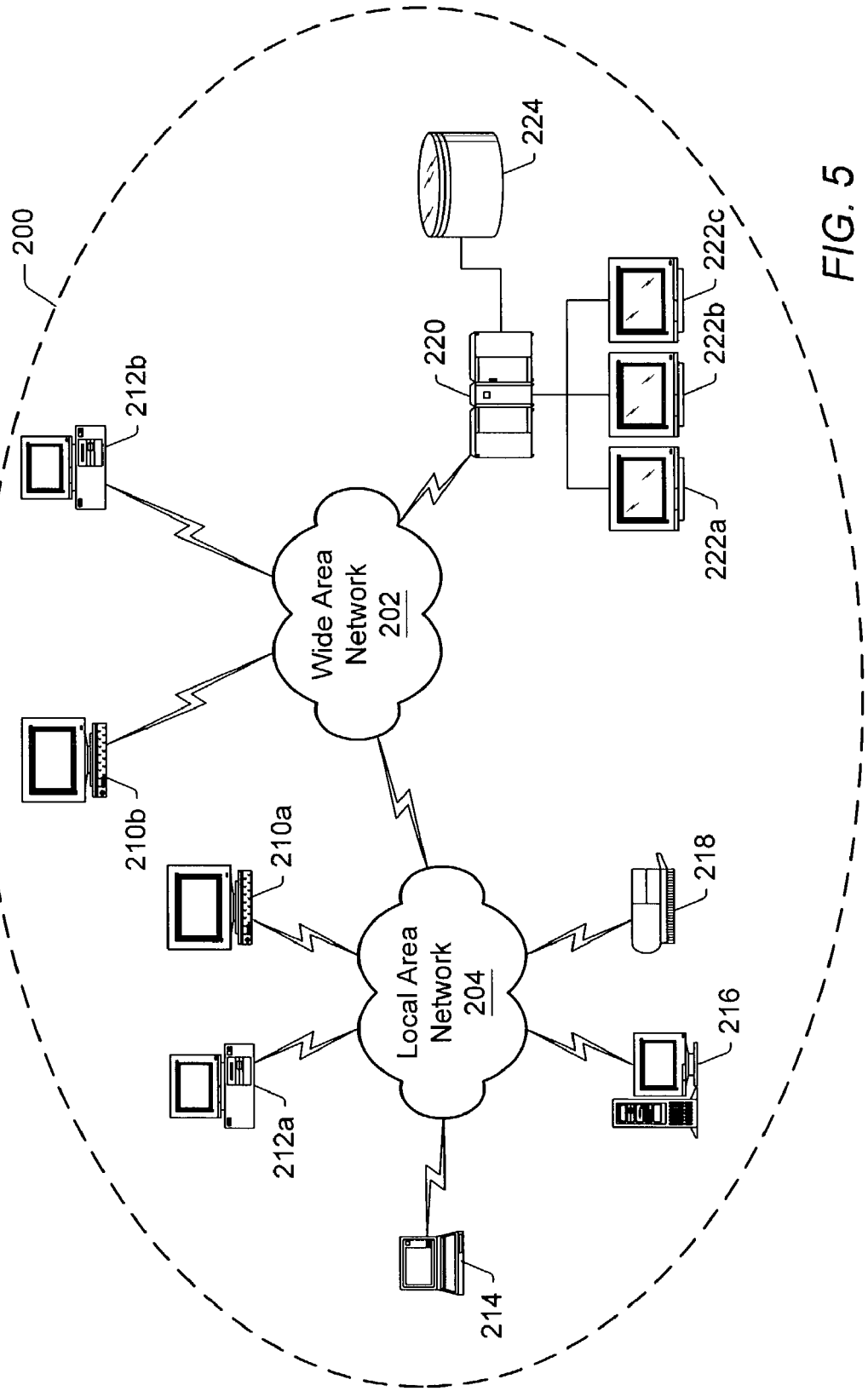
FIG. 5 illustrates a distributed or enterprise computing environment 200 according to one embodiment.

FIG. 5—A Typical Distributed Computing Environment

FIG. 5 illustrates a distributed or enterprise computing environment 200 according to one embodiment. An enterprise 200 may include a plurality of computer systems such as computer system 100 which are interconnected through one or more networks. Although one particular embodiment is shown in FIG. 5, the enterprise 200 may comprise a variety of heterogeneous computer systems and networks which are interconnected in a variety of ways and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 5 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 5 comprises one of each of these computer systems 210a, 212a, 214, and 216 and one printer 218. Each of the computer systems 210a, 212a, 214, and 216 is preferably an example of the typical computer system 100 as illustrated in FIGS. 3 and 4. The LAN 204 may be coupled to other computer systems and/or other devices and/or other LANs 204 through a WAN 202.

A mainframe computer system 220 may optionally be coupled to the enterprise 200. As shown in FIG. 5, the mainframe 220 is coupled to the enterprise 200 through the WAN 202, but alternatively the mainframe 220 may be coupled to the enterprise 200 through a LAN 204. As shown in FIG. 5, the mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote and connected to the enterprise 200 through the Internet.

One or more of the computer systems may couple or connect to a measurement device or instrument that acquires data from a device, UUT, or process. As used herein, the term "data" may include raw or processed data being acquired or generated by an online application, or the result of an offline operation. For example, data may be generated by a measurement device or instrument, data may be deposited in a data store and made available to any number of data clients. The online application may have already performed some data processing on the data. A data store may include persistent storage location for data, datasets, and information. This may be a file on a local computer, network file, local or network database, etc.

In one embodiment, the TDM framework may serve to integrate various applications and data stores dispersed throughout the enterprise 200. For example, the TDM framework may allow an application executing on a first computer system to store technical data in a data store located on or coupled to a second computer system. Similarly, the TDM framework may allow an application executing on a first computer system to retrieve technical data from a data store located on or coupled to a second computer system. The TDM framework may also allow users or applications to search for specific data sets to analyze and view from any computer in the enterprise 200.

Architecture

Figure 6:
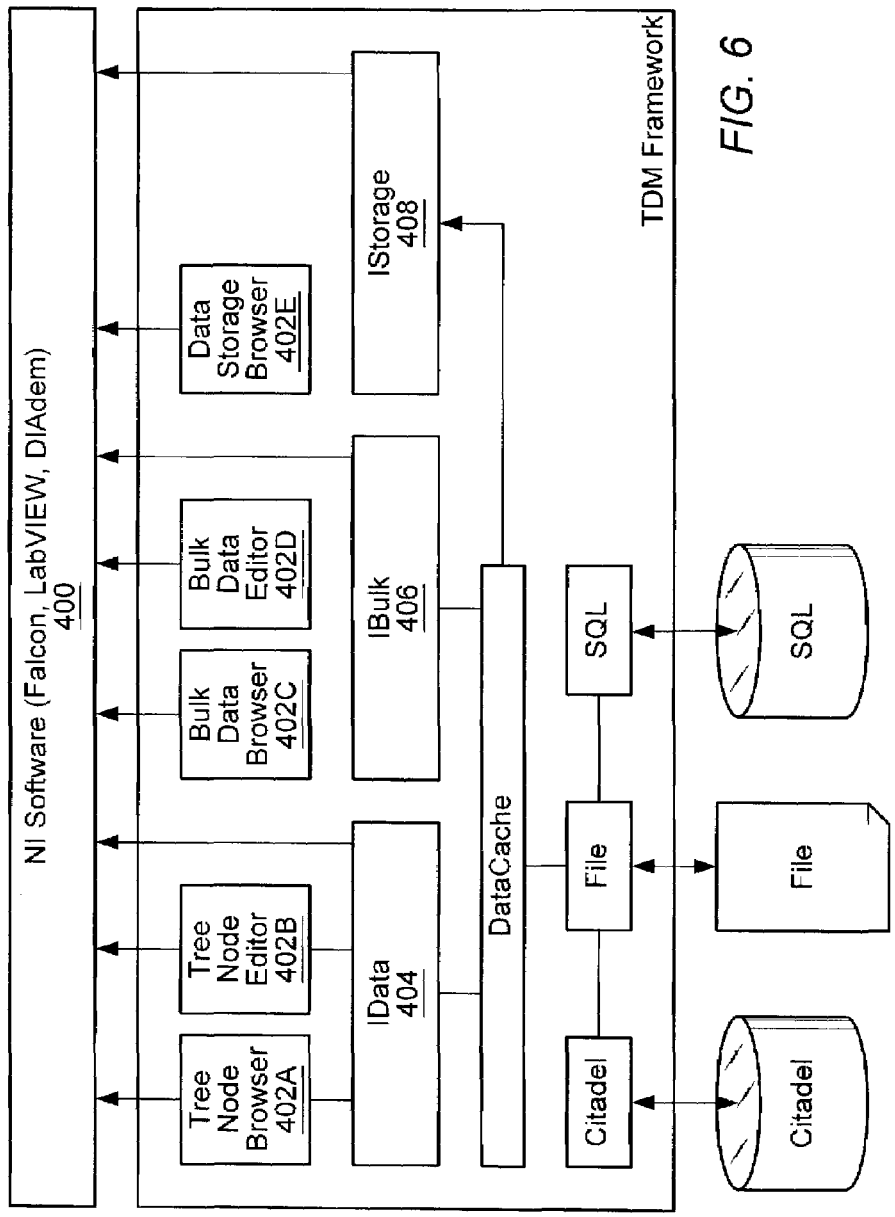
FIG. 6 illustrates an exemplary architecture for the TDM framework, according to one embodiment.

FIG. 6 represents an exemplary architecture for the TDM framework, according to one embodiment. As shown, various software applications 400 may utilize the TDM framework for storage/retrieval of technical data. The software applications 400 may utilize various user interface components 402, depending on what action is needed. For example, the user interface components may include a tree node browser 402A, a tree node editor 402B, a bulk data browser 402C, a bulk data editor 402D, and a data storage browser 402E.

As described above, data may be stored using a combination of meta-data and instance data. The meta-data may specify a collection of attributes describing the data, e.g., where the attributes may be conceptually organized as nodes in a tree. The tree node browser component 402A may comprise a user interface enabling a user to browse various tree nodes, search for attributes having particular values, filter the tree using particular attribute values, etc. The tree node editor component 402B may comprise a user interface enabling a user to edit tree node attribute data, add/remove attributes, etc. Each of these components may utilize the IData interface 404 to interface to the attribute data. The IData interface 404 may comprise an interface for navigating over tree nodes, performing queries/searches, access and modifying attribute data, etc. The IData interface 404 may support the querying/searching functionality even if the type of data store in which the attribute data is stored does not natively support querying/searching functionality, e.g., where the attribute data is stored in plain files rather than some other type of data store such as a relational database.

The following are a few examples of how attribute data may be queried in different scenarios:

Example 1: The attribute data describes a front panel (user interface) for a graphical program. The attribute data may be queried for matches on front panel indicator labels, front panel indicator units, front panel log times, etc.

Example 2: The attribute data describes a block diagram for a graphical program. The attribute data may be queried for matches on data types in the block diagram, nodes in the block diagram, etc.

Example 3: The attribute data describes logged test execution results. The attribute data may be queried for matches on the ID of the unit under test, user name of the test operator, test location, etc.

Example 4: The attribute data describes measurement data acquired by a data acquisition application. The attribute data may be queried for matches on a channel name, channel number, hardware parameters of the data acquisition board, etc.

Similarly, the bulk data browser component 402C may comprise a user interface enabling a user to browse bulk data, e.g., waveform or trace data. The user interface may enable the user to search for a specific time stamp/index of a stream, select a specific range of a stream, etc. The bulk data editor component 402D may comprise a user interface enabling a user to edit bulk data. Each of these components may utilize the IBulk interface 406 to interface to the bulk data. The IBulk interface 406 may comprise an interface to access bulk data, perform data reduction on bulk data, analyze bulk data, etc. For example, if an application needs to display bulk data, the data reduction features may be used, e.g., to display a graph having only a few hundred points, even if the data includes millions of points.

The following are a few examples of different kinds of bulk data: waveforms; traces; block diagram elements for a graphical program (e.g., vectors); user interface elements for a graphical program (e.g., a graph indicator displaying a plot); blobs (Binary Large OBjects); video data or data acquired from a camera or image acquisition device; audio data; etc.

The data storage browser component 402E may comprise a user interface enabling a user to browse for various data stores, e.g., where the data stores are dispersed across a network. The user interface may also enable the user to define new data stores or change the parameters of an existing data store. The data storage browser component 402E may utilize the IStorage interface 408, which provides access to the data stores supported by the TDM framework.

The IData interface 404, IBulk interface 406, and IStorage interface 408 may be implemented using a DataCache component. The DataCache component is described in detail below.

The TDM framework may provide an interface for configuring which data store an application will use to store/retrieve data. The TDM framework may provide methods to define, open, and close data store access. Methods may also be provided for reading and writing data (bulk and attribute data), deleting data, creating new data items, querying for particular data items, etc.

The TDM framework may define a general purpose data storage format for default storage referred to herein as NI Store. In one embodiment, the default data storage format may comprise a particular file format.

The TDM framework may provide methods to archive the content of a data store. Archiving both an entire data store or only part of the data store may be supported. When archiving parts of the data store, links may be added to the data store to point to the archive location.

The TDM framework may provide methods to import data from other file types (e.g., spreadsheet files) into a data store supported by the TDM framework.

The type of data store used to store data may depend on an organization's particular needs. As these needs change, it may be desirable to change the storage type. Thus, the TDM framework may support changing the storage type used by an application. For example, small applications may start by using the provided default file-based storage. As the application grows, the storage mechanism may be changed to a database without affecting the application's code.

The TDM framework may also allow applications to register to be notified when changes occur to a particular data item.

Data Caching

The TDM framework may support data caching in the data store interface. When using the DataCache component directly, an application can determine which data is cached in the DataCache and which data is transferred directly between the application and the data store. Using the higher-level interface UDSA interface, the client application relies on UDSA to decide when data is cached. Data caching and UDSA are described in more detail below.

Data Access by Multiple Applications

When two or more applications access the same data, the TDM framework controls write access from these applications on the data. Normally only one application at a time can write the data, while multiple applications can read the data. In some specific cases, simultaneous write access by multiple applications may be allowed. In these cases, the TDM framework manages the access and maintains a consistent state in its cached data and the data store.

Data Store Management

In one embodiment, the TDM framework may support various functions related to the management of multiple data stores. For example, these functions may allow a user or client application to delete entries from a data store or move or copy data store entries. The TDM framework may also support mapping or copying data entries from one data store to another data store. In one embodiment, when different data stores use different data models, a client application may be responsible for mapping the data from one model to another. In another embodiment, automatic conversion between the data models may be supported. The user may need to supply information specifying how the conversion is to be performed. For example, the user may utilize an easy-to-use tool to specify mapping points in the two data models.

In one embodiment, the TDM framework may also support automatic synchronization/replication between multiple copies of the same data store. For example, when a change to one of the copies is made, the other copies may be automatically updated to reflect the change. The synchronization/replication process may be bi-directional. Each data store may reflect the complete and most up to date status after the synchronization/replication. Updates may be performed with each change or at regular intervals.

A unidirectional process to import new data from a remote data store to a network master data store may also be supported. This may be useful in a portable application where data is acquired on a disconnected computer to a local data store, and then imported to the network master data store when the computer is reconnected to the network. The disconnected computer may or may not receive data from the master data store which came from other client systems, or may receive such data on demand.

Security Issues

In one embodiment, the TDM framework may include a security model to define access rights to stored technical data. Security may be enforced throughout the TDM framework to limit access to the technical data. In one embodiment, the security model may be compatible with the security defined in the ASAM-ODS specification and may be similar in design. The security model may also be compatible with security concepts utilized by various applications that utilize technical data, e.g., LabVIEW DSC.

Figure 7:
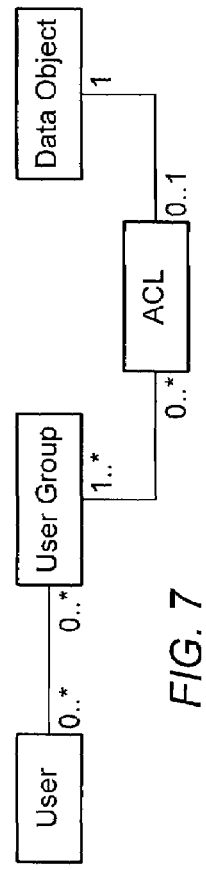
FIG. 7 illustrates a security model built around users, user groups, and an access control list (ACL)

In one embodiment, the security model may be built around users, user groups, and an access control list (ACL), as shown in FIG. 7. Individual users may be defined and given a unique password. Users may be assigned to one or more user groups. User groups may be defined as is appropriate in individual applications, projects or organizations. The ACL assigns access rights for individual user groups to specific data objects (data items) in the data store. For a user group/data object pair, specific access rights may be defined in one entry of the ACL.

Specific data models and/or data stores may choose not to implement security, so that their data is accessible to all users. For example, data stores based on files may typically not implement security. However, formats such as ATF may be able to store the security information in a data model.

According to one embodiment, access rights can be granted at three different levels in the data model, as follows:

1. Application Element—An application element in the data model is assigned an access right in the ACL. All instances of this application element have the same access rights and need no individual entries in the ACL. This is appropriate for many small and medium size applications where defined groups of users have access to all instance of a particular type.

2. Instance Element—Individual instance elements are given access rights in the ACL. This is appropriate for large data storage system where data from different groups or projects are sorted in the same data model, and access rights need to be differentiated between different groups at the instance level.

3. Application Attribute—Access can also be given at the application attribute level, such that groups will have access to specific attributes on all instances of an application model. Such specific groups can access the attributes appropriate to them.

Alternatively, if none of these three access rights is defined, then if the instance has a parent instance with access rights defined, they may be copied to the child.

According to one embodiment, the ACL may assign five different access rights to a user group for a specific data object. These are: Read, Update, Insert, Delete and Grant. Some of these access rights do not apply to some of the access right level listed above and may be ignored by a data store.

Read—The user group is able to read the data object.

Update—The user group is able to update/edit the data object.

Insert—The user group is able to insert/add a new data object of the given type.

Delete—The user group is able to delete the specified data object.

Grant—The user group is able to grant/pass on its own rights for a specific data object to another user group.

Most of the functionality required for security is part of a data store implementation to limit access to data and manage the information in the ACL. The different interfaces and components between an application and the data store may pass security information from the application to the data store, such as the user name and password, and may pass information about access rights for new data objects to the data store so that they can be stored in the ACL. Additionally, security management information may be passed from a separate tool to the data source. Security management may be performed locally to the data source, or remote security management may be possible, e.g., may be handled through the DataCache and DataCache server.

Although the security information is normally stored in the application data model, user and user group management may be done using a separate tool or component to edit this information. Security information may not be accessible through the regular data storage functions. Additionally this tool may be used to directly manipulate the ACL when incorrect information is present.

Management of user information may be limited to one user group, which is designated as a "Superuser" group. This group can never be empty and only members of this group can add new members to this group.

User Interface Components

In one embodiment the TDM framework may supply a set of user interface components related to technical data management. For example, a user interface component may allow various applications to easily display a user interface showing the data model and/or contents of a data store. A DataCache browser component providing this functionality is described below. A user interface component may also be used to select items from a data store for loading or other processing. Additional user interface components may be available for performing other tasks, such as configuring security management, configuring networked data stores, etc.

The user interface components may be activated through a number of different interfaces including UDSA, or as separate ActiveX controls. The user interface components may utilize the UDSA interface or a lower-level interface, such as the DataCache interface.

Detailed Architecture

Figure 8:
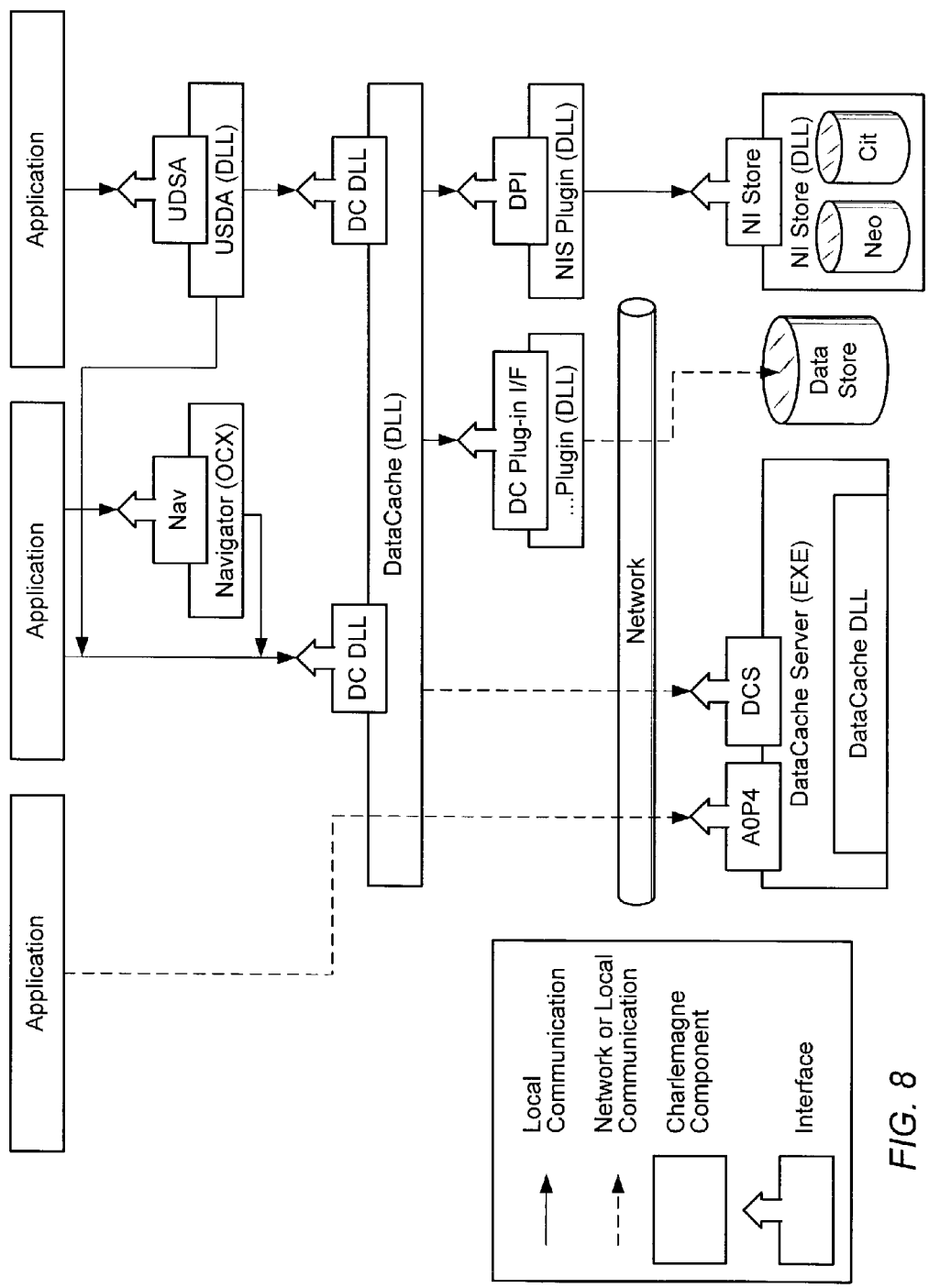
FIG. 8 illustrates a more detailed architecture of the TDM framework, according to one embodiment.

The TDM framework may include a number of components with defined internal and external interfaces. In one embodiment, the components include a DataCache DLL, DataCache browser control, UDSA (Unified Data Source Access) DLL, DataCache server, DataCache plug-ins, and a native database referred to as NI Store. FIG. 8 illustrates a more detailed architecture of the TDM framework, according to one embodiment.

The DataCache DLL shown in FIG. 8 is a core component of this architecture. The DataCache DLL in the TDM framework architecture is used by an application to directly interface with a data store, providing the highest throughput. It is also a component of the DataCache server, which enables remote and shared data source access. The DataCache DLL may be used by an application to access a local data store or to communicate with a networked DataCache server to access a remote data store. The DataCache DLL can be used as a local data cache by the application. In one embodiment, the purpose of the DataCache is to provide a common access point to different data sources for an application and to cache information between the application and data store. In one embodiment, the DataCache may be implemented as a DLL that provides a COM-like virtual class interface (e.g., NI-COM) accessible to a wide range of applications.

To access different data sources, the DataCache has a standard plug-in architecture (DataCache Plug-In Interface) that allows different data source specific plug-ins to be used with the DataCache. Each DataCache plug-in may provide access to a specific data store for the DataCache DLL and server. Plug-Ins can be created for additional data stores to quickly add support for new data stores. Each DataCache plug-in may implement the DataCache Plug-In Interface and convert its calls to data store specific communication. Each DataCache plug-in may communicate with the DataCache DLL through the DataCache Plug-In Interface. To access a particular data store, each plug-in uses the appropriate interface or communication protocol of the particular data store.

Internally, the DataCache DLL may implement a DataCache object, which is an object-oriented in-memory data storage. Different applications and components may use this in-memory database for holding and managing their internal technical data. The DataCache object includes functionality for caching data between an application and the data store through functions that allow the application to specify where data is held. The application using DataCache may manage the caching process, using the functionality provided by DataCache.

The DataCache DLL may be accessed directly by an application or through several other components of the TDM framework such as USDA or the DataCache browser. It is also an integral part of the DataCache server.

DataCache Browser

The purpose of the DataCache browser control is to provide a ready-made, flexible user interface component that can be used to visualize the contents of a DataCache object or data store, and to perform specific actions with Data-Cache. An application may use the browser to display the contents of a data store, as well as information about the data model. The user can select specific data items displayed by the browser for processing.

The browser may utilize the data model or meta-data associated with the data store contents so that the browser is able to properly interpret data of any type and properly display the data. For example, the browser may utilize the meta-data to determine a structure of the data and display the data according to the determined structure. For example, the data may include a plurality of elements. Determining the structure of the data may involve determining a relationship among the plurality of elements. The data may then be displayed so as to indicate the relationship among the plurality of elements.

The DataCache browser control may directly interface to the DataCache DLL to access the data in the DataCache. In one embodiment, the browser provides an ActiveX control interface, which is used by a client to couple to the control. The ActiveX control interface may include a number of methods and events and the control user interface.

The browser API provides access to the DataCache through the browser control for performing common Data-Cache operations. For more flexibility, the DataCache interface may be used in conjunction with the browser control. The browser control may also be used with the UDSA interface.

Figure 9:
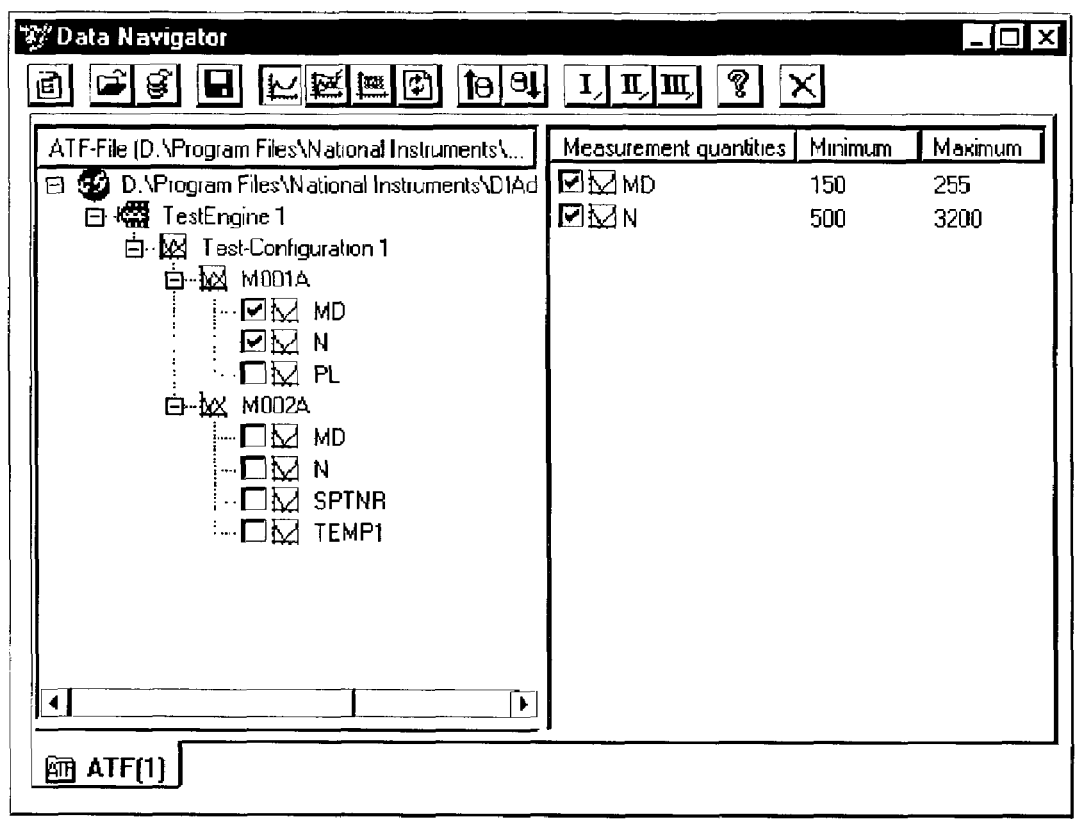
FIG. 9 illustrates an exemplary graphical user interface for a DataCache browser control.

FIG. 9 illustrates an exemplary graphical user interface for the DataCache browser control. The user interface of the browser control is laid out in the manner of an explorer, with a tree view on the left hand side of the control. The tree view displays the structure of the data store (data model) and lists the data items present in the data store. Depending on the configuration of the browser, more or less detail about the data model is displayed. On the right side of the user interface is a detailed view supplying more information about marked or selected objects in the tree view. For each data item, certain attribute values are displayed. The list of attributes to be displayed can be selected through a popup dialog window. The relative size of the tree view and detailed view sections can be adjusted with a movable separation.

The browser control can be configured using a configuration file to determine the exact display of the data model and data items. This includes the browse path through the data model, as well as attributes to be displayed and any filter settings.

Figure 10:
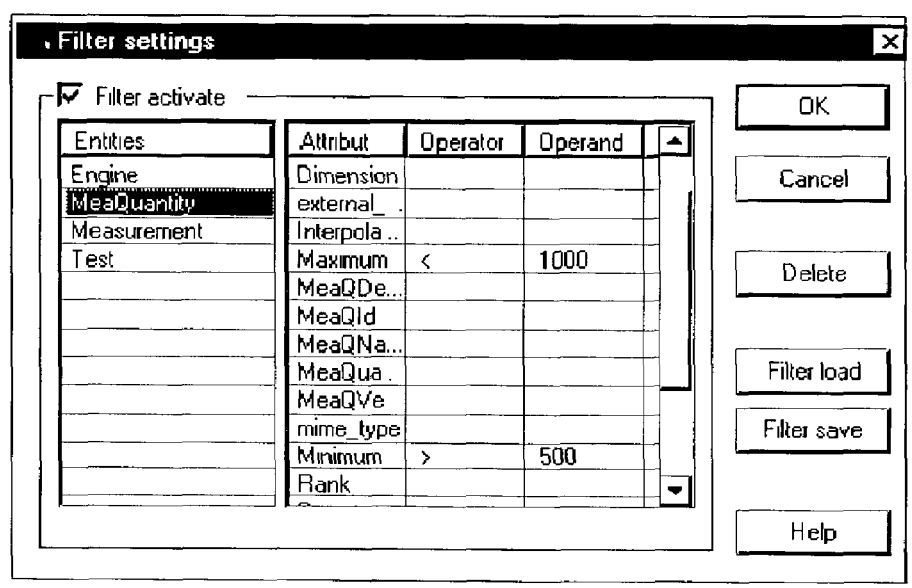
FIG. 10 illustrates a popup dialog used to configure specific ranges or values for selected attributes.

The browser also includes a number of popup dialogs used to access and parameterize different functions of the browser such as filtering and searching. The browser can filter the display of data items in its user interface based on the attribute values of the data items. To configure the filter, a popup dialog such as shown in FIG. 10 is used to configure specific ranges or values for selected attributes.

Figure 11:
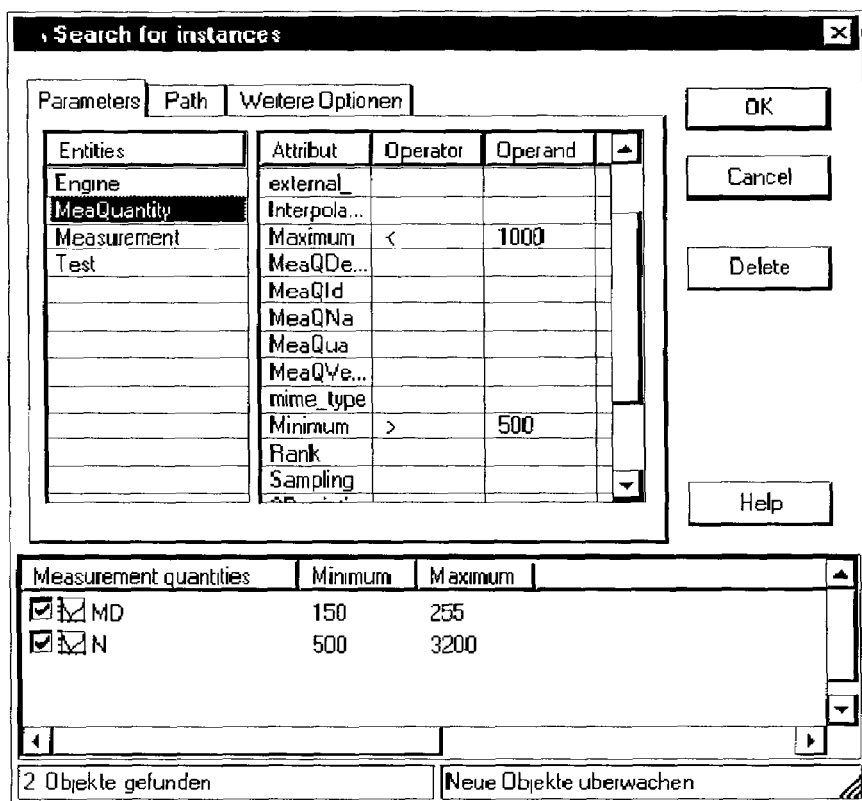
FIGS. 11 and 12 illustrate a dialog to perform a search function to search a data store for specific data items that fit certain criteria.
Figure 12:
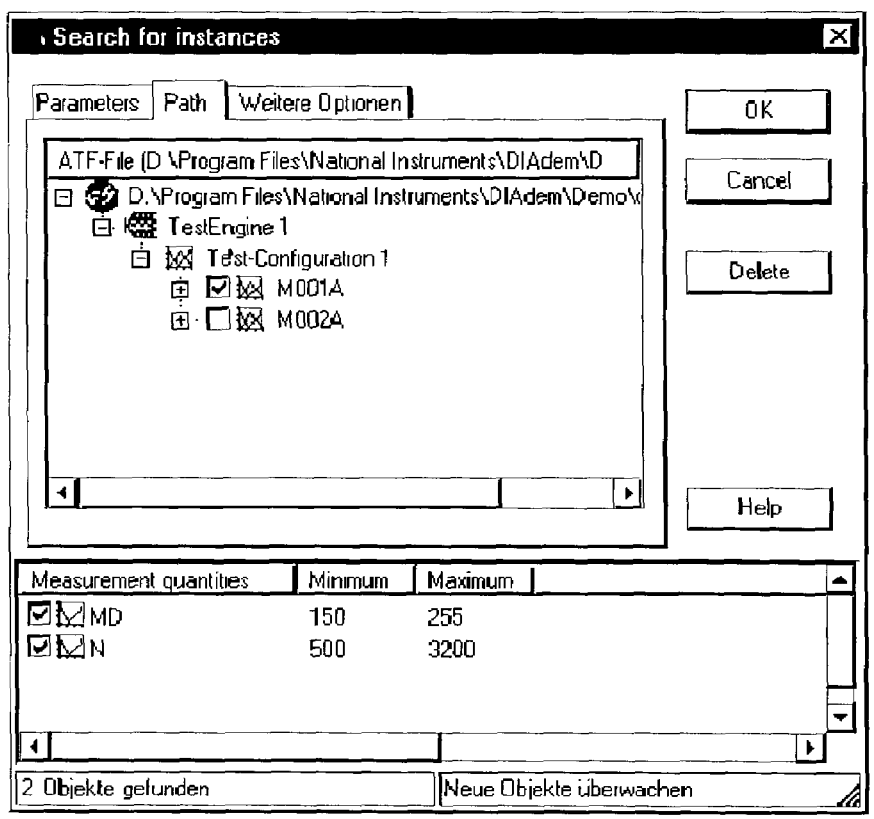

The browser also includes a search function to search the current data store for specific data items that fit certain criteria. A separate dialog to perform the search may be displayed, as shown in FIGS. 11 and 12. In this dialog the user can specify the portion of the data store to search in, as well as the search criteria, e.g., the attribute values of the data items. The found items may be displayed either in an additional section of the dialog or in a new section of the main browser window. The data items found by a search can be identified through the API similar to the selected and marked data items.

The browser may utilize an interface of the TDM framework to perform the type of filtering and searching described above. The interface may support the querying/searching functionality even if the type of data store in which the attribute data is stored does not natively support querying/searching functionality, e.g., where the attribute data is stored in plain files rather than some other type of data store such as a relational database.

UDSA

The UDSA interface shown in FIG. 8 comprises a higher-level application interface to the DataCache DLL for general applications. The UDSA interface may simplify the task of performing technical data management in a client application. The UDSA may handle data store read and write access and may present these functions in an ODS like manner to the client application. It may handle low-level function calls to the DataCache including caching data between the data store and the application. Thus, when the UDSA interface is used, caching does not need to be addressed by the client application. Other functionality such as filtering may also be presented as simple functions according to the ODS model. The UDSA interface is described in detail below.

Networked DataCaches/DataCache Server

In one embodiment, it may be desirable to make data available across an enterprise which may contain multiple data stores distributed across networked servers. These distributed data stores create the impression that they are actually part of one central storage, referred to herein as a networked DataCache. The user may thus be able to find various kinds of measurement data without knowing where they were from the start. As described above, the data may also be adequately self-describing via a data model so that a user or application is able to find it and use it without implicit knowledge of the data, its meaning, or its structure. The networked DataCache allows a user of measurements to know where a measurement is and what it means.

Figure 13:
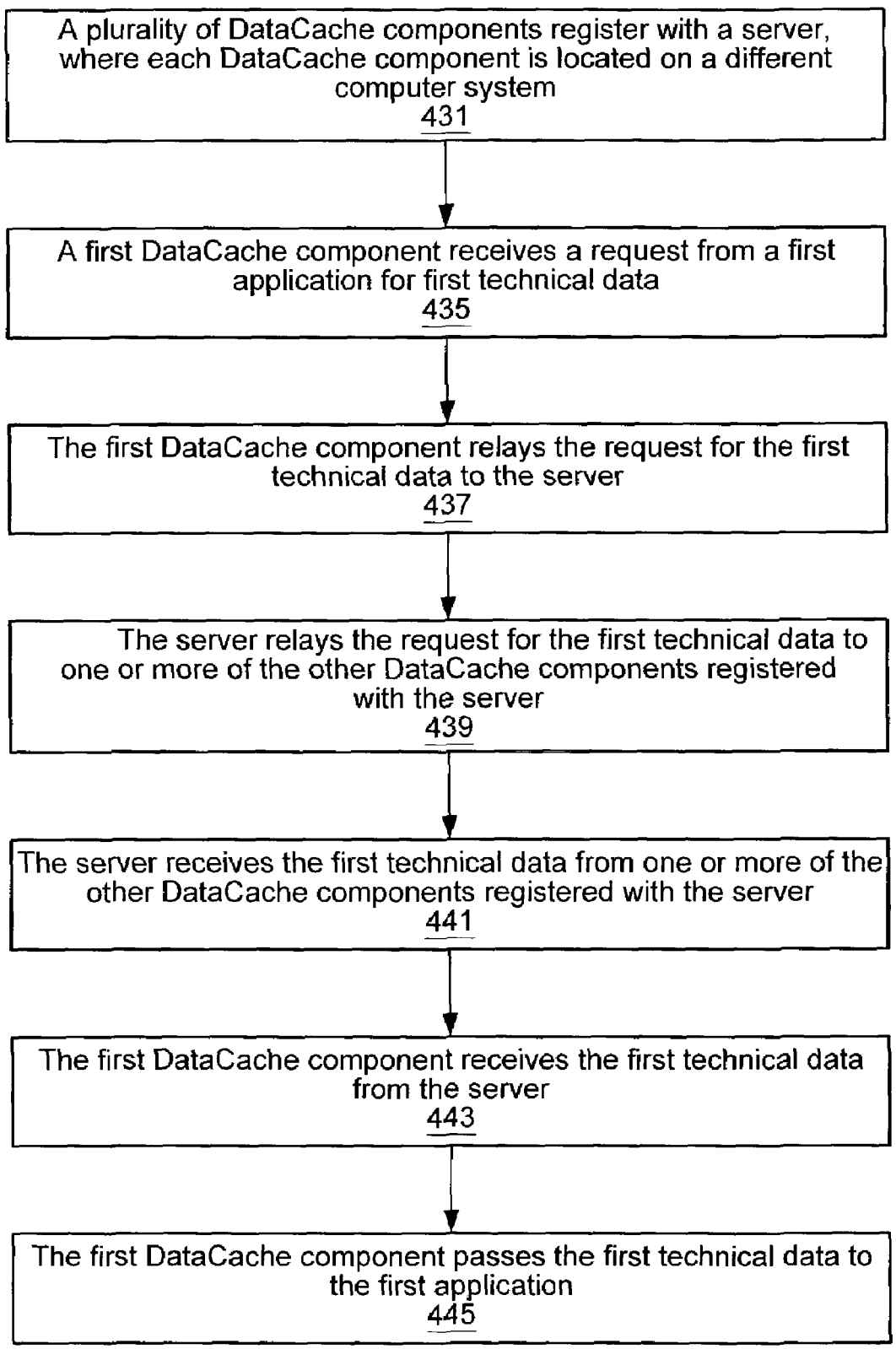
FIG. 13 is a flowchart diagram illustrating one embodiment of a method for networking DataCache components.

FIG. 13 is a flowchart diagram illustrating one embodiment of a method for networking DataCache components. It is noted. that FIG. 13 illustrates a representative embodiment, and alternative embodiments are contemplated. Also, various elements may be combined, omitted, or performed in different orders.

In 431, a plurality of DataCache components may register with a server (DataCache server), where each DataCache component is located on a different computer system.

In 435, a first DataCache component from the plurality of DataCache components may receive a request from a first application for first technical data.

In 437, the first DataCache component may relay the request for the first technical data to the server.

In 439, the server may relay the request for the first technical data to one or more of the other DataCache components registered with the server.

In 441, the server may receive the first technical data from one or more of the other DataCache components registered with the server.

In 443, the first DataCache component may receive the first technical data from the server.

In 445, the first DataCache component may pass the first technical data to the first application.

This method and various alternative embodiments of the method are discussed in further detail below. It is noted that in one embodiment, instead of relaying the request for the first technical data to the DataCache server, the first DataCache component may relay the request for the first technical data directly to one or more of the other DataCache components registered with the server and may receive the first technical data directly from one or more of these other DataCache components. For example, the first DataCache component may query the server to determine the other DataCache components registered with the server.

The networked DataCache may support a browsing mechanism whereby DataCaches can find each other. There are various ways to achieve this in various embodiments. One way is for a user to specify a connection from one DataCache to another. This connection may be maintained, and both DataCaches may exchange information about all the other DataCaches that each one knows about. In a slightly more sophisticated scheme, a DataCache may establish a connection to another by publishing its presence to a server that keeps track of the address of all DataCaches that have registered themselves. In one embodiment, there may be multiple such servers, such as one on each machine in a network. These servers could in turn publish their presence to each other so that any DataCache registered in one can find all the other DataCaches registered in other servers.

The mechanism above may make it possible for a user or application to access any DataCache in the network without having to know where they are (after the initial discovery). Given that part of the purpose of the DataCache is to provide uniform access to various stores of self-describing data without implicit knowledge of how they are implemented, the networked DataCache inherits the ability to retrieve data without having to know the details of how it is stored. Also, because the data is self-describing, the networked data cache makes it possible to do a global search for all measurements that share a given attribute. If a user defines a query, all networked DataCaches (or a subset identified by the user) can exchange the query and then all DataCaches that find a match can inform the originating networked DataCache.

A further embodiment of the system allows a user or application to fetch only pieces of the data at a time in order to expedite visualization (e.g., if the data has a very large size, it could begin to be processed a piece at a time instead of waiting for all of the data to be fetched, which could be a problem over a network). In one embodiment, several copies of a given measurement may exist (e.g., by using globally unique ids), and the networked DataCache finds the copy that is nearest or most easily accessible.

A DataCache server component may be used to implement networked DataCaches. The DataCache server may be an extension of the DataCache DLL for a networked system. It may include a standalone executable version of the DLL and may be used by an application to access a data store over a network. An application may use the local DataCache DLL to communicate with the remote server, which in turn may access the data store. In one embodiment, the DataCache server is based on the DataCache DLL and may access data stores through the same DataCache plug-ins.

The DataCache server may also act as a means to share data sources with multiple clients. When a client application accesses a data store using DataCache, the data store may be registered with the DataCache server. Other DataCache clients can browse the DataCache server for existing data stores and connect to them.

Using the DataCache server, multiple clients can connect to the same data source and share the data from the data source. The data may be shared at the DataCache object level rather than from the source itself. The DataCache object manages the communication to the data source, caching the data locally. When requested from the clients, the data is passed from the DataCache object. When additional information from the data source is required or new data needs to be written, DataCache initiates the communication to the data source.

Writing data to the DataCache and therefore to the data source is normally limited to one client application at a time. The DataCache manages accesses from multiple clients such that a consistent image of the data is presented to each client.

The DataCache server may act as a central information source for existing data stores. The server may maintain information about existing data sources and provide such information through a browsing interface to clients. Using this browsing interface, clients may retrieve information about current data sources and connect to these sources to share the data with other clients.

DataCache servers may be pre-configured with information about commonly used data sources such as location, connection information, description, etc. This information may be set in the server using an appropriate tool or configuration file, and clients can select one of these pre-configured data sources. The configuration of data sources in the server allows for easy changes to the configuration that will be automatically used by clients the next time they connect. In one embodiment, the DataCache server does not maintain a live connection to all pre-configured sources, but connects to a data source on the first request from a client application.

The information about data sources stored in the server, whether pre-configured or from a dynamically opened data source, may be protected with access rights security similar to the data security described elsewhere herein.

In one embodiment, the DataCache server may also implement an AOP4 interface on top of the DataCache server to provide an ASAM-ODS compliant server based on different data stores supported by the DataCache DLL. The AOP4 interface is defined by the ASAM-ODS standard, and the DataCache server/DLL/plug-ins may map this interface to the appropriate data store communication.

In one embodiment, the DataCache server handles network communication through the DC-DCS communication and converts this to the appropriate DataCache DLL calls.

NI Store

In one embodiment, the TDM framework may provide a default database referred to herein as NI Store to store measurement data and information from different TDM applications. A variety of implementations may be used to store data models, attribute data, and measurement data. The data may be distributed between multiple databases with appropriate links between them. An NI Store interface such as a DLL may be used to access NI Store and may parse/join the information between different internal databases if used and maintain/update the internal links.

The NI Store may provide a storage mechanism for both attribute data and bulk data. Instead of using a single technology to implement both attribute data storage and bulk data storage, optimal storage mechanisms may be used for each of these component components of the measurement. In one embodiment, a relational database storage mechanism may be utilized for the attribute data storage. A database specialized for storing bulk data may be utilized to store the bulk data. One embodiment of such a database, referred to as a Citadel database, is described below.

As described above, the attribute data may include a series of values that characterize the measurement. Applications may utilize the stored attribute values to later identify the measurement. For example, an application may search among a large number of measurements to identify measurements that have attributes meeting particular criteria. In various applications, the attributes may include any of various types of information, including information collected at the time the measurement is made. For example, attributes may specify the time and date of the measurement, the name of the person performing the test, the serial number of a unit under test, etc. Attributes may also include values derived from the measurement to be used for faster searching, such as the peak or RMS value. The attributes may also include a reference to other important datasets, such as calibration data. Attributes may also include links such as URLs which reference any of various kinds of information.

The searching performed on the attribute data may be facilitated by using relational database technology. For example, by utilizing an industry standard interface such as SQL, any database supporting SQL may be the basis of the attribute storage. In one embodiment, the NI Store may comprise ASAM-ODS compliant data storage.

In one embodiment, attribute storage may be implemented through a table in a relational database. Each measurement may be represented by a row in the table. Each attribute may be stored in a separate column in the table with one column reserved for a pointer to the bulk data of the measurement. The bulk data may be stored in a file or in a database such as the Citadel database which is expressly designed to store bulk data.

Figure 14:
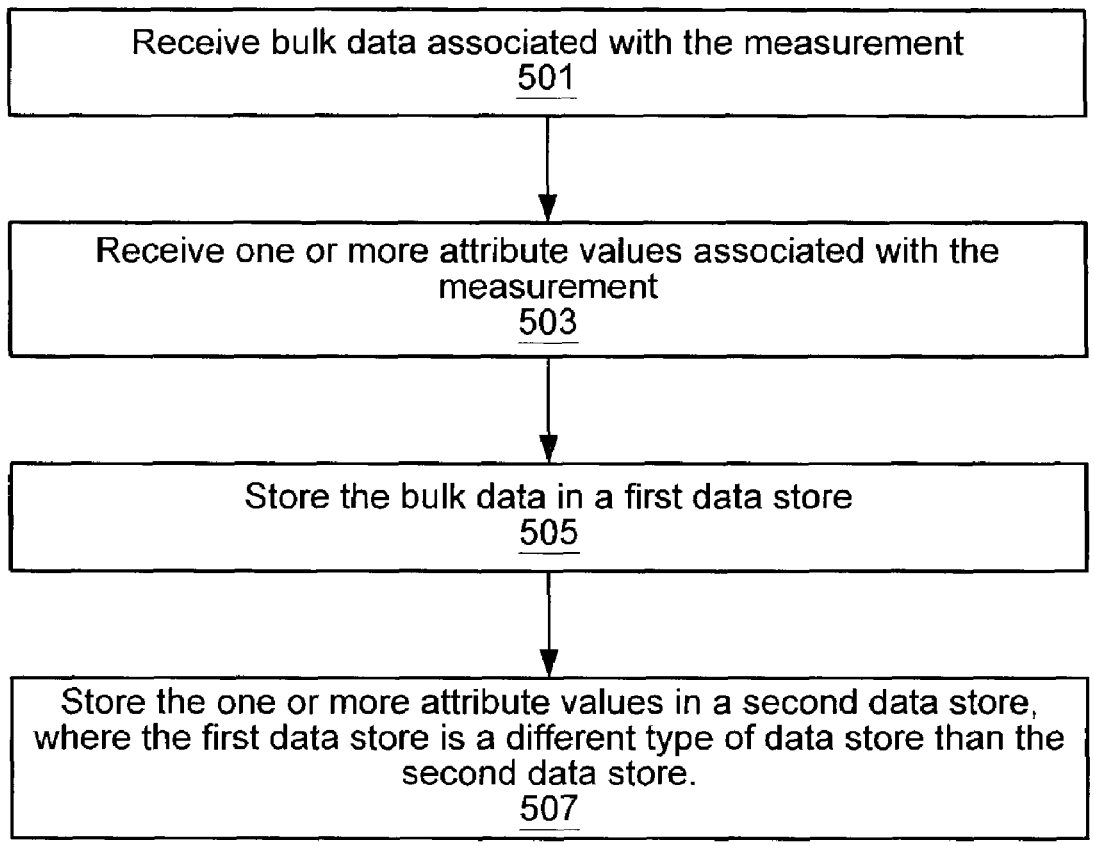
FIG. 14 is a flowchart diagram illustrating one embodiment of a method for storing measurements using different storage mechanisms.

FIG. 14 is a flowchart diagram illustrating one embodiment of a method for storing measurements using different storage mechanisms as described above. It is noted that FIG. 14 illustrates a representative embodiment, and alternative embodiments are contemplated. Also, various elements may be combined, omitted, or performed in different orders.

In 501, bulk data associated with the measurement may be received. For example, the bulk data may be received from an acquisition application that acquired the bulk data from one or more hardware devices. The bulk data may comprise any of various kinds of bulk data, including waveform data, trace data; data representing block diagram elements of a graphical program; data representing blobs (Binary Large OBjects); etc.

In 503, one or more attribute values associated with the measurement may be received. For example, the one or more attribute values may include values for attributes defined by a data model describing the measurement. The attribute values may be received from various sources, such as an application that also acquired the bulk data. For example, this application may acquire the bulk data, calculate the one or more attribute values, and send the bulk data and the attribute values to a component for storage.

In 505, the bulk data may be stored in a first data store. As described above, in one embodiment, the first data store may be a data store specialized for storing bulk data. In another embodiment, the bulk data may be stored in one or more files.

In 507, the one or more attribute values may be stored in a second data store, wherein the first data store is a different type of data store than the second data store. As described above, in one embodiment, the second data store may be a relational data store, e.g., a relational database.

It is noted that although the method of FIG. 14 is described in terms of measurement data, the method may be utilized to store any of various types of data, e.g., where a first portion of the data comprises attribute data and a second portion of the data comprises bulk data. The bulk data may include bulk data of any kind, including waveform data, trace data, data representing a blob (Binary Large OBject), data representing a user interface element, audio data, video data, etc.

It is also noted that in an alternative embodiment, different measurements or different datasets may be stored in different data stores. For example, consider a first measurement having associated bulk data and attribute values. The bulk data of the first measurement may be stored in a first data store, and the attribute values of the first measurement may be stored in a second data store, as described above. When storing a second measurement the bulk data of the second measurement may be stored in a different data store than the bulk data of the first measurement, and/or the attribute values of the second measurement may be stored in a different data store than the attribute values of the first measurement. As one example, the decision of which data store should store the bulk data may be based on the size of the bulk data. For example, if the size is below a threshold value, the bulk data may be stored in one data store, and if the size is above the threshold value, the bulk data may be stored in another data store.

Also, in one embodiment, the bulk data of a single measurement or dataset may be distributed across multiple data stores. For example, a first portion of the bulk data associated with the measurement may be stored in one data store, and a second portion of the bulk data associated with the measurement may be stored in another data store. Also, the bulk data may be replicated across multiple data stores so that a full copy of the bulk data is stored in each data store. In one embodiment, the attribute data of a single measurement or dataset may be distributed across multiple data stores in a similar manner.

Unified Data Source Access (UDSA)

This section describes one embodiment of an interface provided by the TDM framework, referred to as Unified Data Source Access (UDSA). The UDSA interface may be used by different applications for communication with different data sources. The description below refers to an embodiment of UDSA as a dynamic link library (DLL). However, it is noted that in alternative embodiments, the interface may be implemented in any of various other ways. For example, in one embodiment, UDSA may comprise one or more standalone executable programs. As another example, in one embodiment UDSA may be instantiated as an object and accessed by calling methods of the object.

Also, in various embodiments, the TDM framework may utilize any of various network architectures. In one embodiment, applications may access the UDSA interface locally, e.g., as a DLL on the same computer as the calling process. In another embodiment, applications may access the UDSA interface according to a client/server architecture, where the application is located on a first computer and calls a UDSA server portion located on a second computer. Also, where an application accesses the UDSA interface locally, a client UDSA portion on the local computer may interface with a server UDSA portion on a second computer.

The UDSA interface allows for communication with different data sources from different applications. UDSA provides one simple programming interface to be used in different application software packages that access a variety of data sources. The application software packages that utilize UDSA may be constructed using different development tools or environments. An appropriate UDSA application programming interface (API) may be provided for each desired development tool. In one embodiment, UDSA utilizes a DataCache component, which handles the active-memory data storage and caching between an application and the data source.

The UDSA interface connects to one or more data sources and exchanges data with the sources. It may also be operable to read and write ATF (ASAM Transfer Format) files. Support for additional data sources may be added through the DataCache plug-in interface (DPI). In addition, the UDSA DLL may provide an interface to the data browser component, which can view the contents of a data source and can select data items (instances) in a data source for further processing.

FIG. 8 illustrates the relationship between the different components. In some cases, applications may access the DataCache directly instead of utilizing the UDSA interface. An application may also use a separate internal interface built on top of the UDSA interface to access data sources.

This section describes the UDSA interface and documents in detail the UDSA DLL interface, according to one embodiment. In various embodiments, UDSA may also available in native implementations for particular applications. For example, the LabVIEW graphical programming development environment may utilize a UDSA VI library to access data sources from within a LabVIEW VI (graphical program). Other examples include UDSA function panels for use within the LabWindows/CVI application development environment and UDSA autosequences for use within the DIAdem application. The function documentation in this section describes the use of UDSA in general. However, slight variations may exist in specific functions for various applications, including different parameter ordering.

The UDSA DLL, through the DataCache component, may support a number of different data sources. For example, in one embodiment the UDSA DLL may support data sources such as: ASAM-ODS (AOP3) servers; AOP4 files; ATF files; DIAdem files; file system based on ATF and DIAdem files; EXPRESS files (EXPRESS files are ASCII files complying with the ISO10303 (STEP) standard and are used to store the data model of an ASAM-ODS compatible data store); XML files; SQL databases; object-oriented databases; Citadel databases; etc.

When working with a data source, the UDSA DLL may assign a handle to the specific data source connection. This connection is to one particular database on a database server. UDSA can handle simultaneous connections to multiple database servers or databases on one server. The respective server may support this functionality. The data source handle assigned by UDSA may reference the particular data source connection throughout the UDSA API.

UDSA Data Models

In one embodiment, UDSA may use data models similar to those defined by the ASAM-ODS standard, as described in this section. The data models utilized by UDSA may, generally speaking, be object-oriented structures. The data model may define different data objects (classes), while an application generating and storing data in the data model may create instances of these data objects.

The meta-data or data model may include data objects commonly called entities or elements that explain the relationship between the data objects. An entity in a data model may include a collection of properties representing one piece of information. The collection of properties may describe the piece of information or object. Each property is also referred to herein as an attribute.

The different entities in a data model are linked to each other according to the meaning of the data. The links between entities may also be stored as reference attributes.

Figure 15:
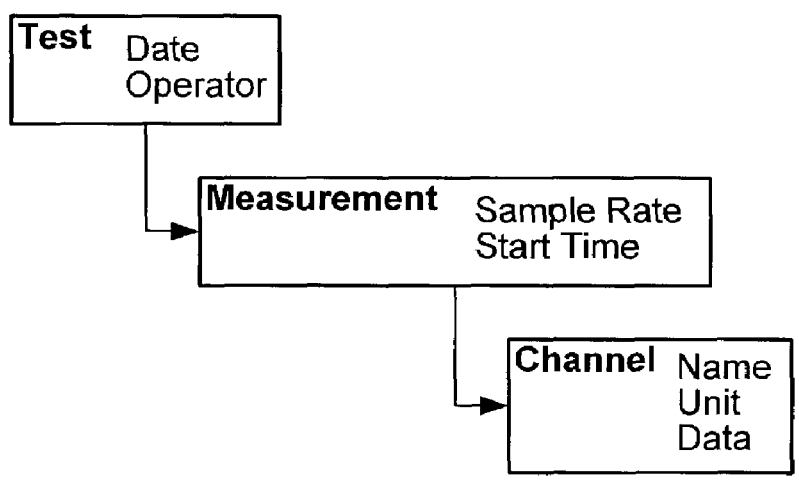
FIG. 15 illustrates part of a simple exemplary data model for technical data management including a Test entity, Measurement entity, and Channel entity.

FIG. 15 illustrates part of a simple exemplary data model for technical data management including a Test entity, Measurement entity, and Channel entity. The Test entity includes two attributes, Date and Operator, as well as a reference attribute, which while not explicitly listed, link the Test entity to the Measurement entity. Similarly, the Measurement entity includes two attributes, Sample Rate and Start Time, and is linked to the Channel entity. The Channel entity includes Name, Unit, and Data attributes.

In defining base and application models, base elements and base attributes may be differentiated from application elements and application attributes. Base elements and base attributes are part of the base model, while application elements and application attributes are part of the application model. Base attributes may either be required or optional. In one embodiment, required base attributes of a base element must be copied into the application data model as application attributes in order for the data model to be valid. The application model may define additional application elements and attributes on existing elements not present in the base model.

A measurement object and measurement quantities object may be defined as part of the base model. The measurement object (named 'Measurement' in FIG. 15) may include all the information of one measurement. The measurement quantity object (named 'Channel' in FIG. 15) is owned by the measurement object and may include all the information of one channel or source in a measurement. Some functions in the UDSA DLL specifically reference these two objects.

It is noted that the data model discussed above with reference to FIG. 15 is exemplary only, and any of various data models may be utilized. For example, in other embodiments the data model may define any of various other kinds of information, such as: information related to users/user groups; information specifying engineering units, e.g., to specify units used when a measurement is acquired; information specifying physical dimensions; information related to a unit under test (UUT); information related to test equipment utilized; information related to test sequences with which the measurement was made; information indicating a data/time of the measurement; etc.

Data in a data source may be associated with instances of the different entities defined by the application data model. Each entity of a data model can have a number of different instances, analogous to different records in a database table. To identify each instance, a unique instance key may be created. This key is generated by the UDSA DLL and can be retrieved or created using different functions in the API. The instance key is used with the DLL to clearly specify an instance for various operations.

Data generated by an application and written in a data source are stored in new instances of different entities defined in the application data model. When new instances are created, their attribute value and links to other instances may be set.

When the UDSA DLL opens a data source, a handle to the data source may be generated and returned. This handle identifies the connection to the data source for the duration of the open connection and communicates with the data source in the DLL. The handle for an open connection is only valid for the extent of the connection, and re-opening a connection may generate a different handle than before. Also when the DLL is re-started and a connection is opened, a different handle may be generated.

A unique instance key may identify instances of different entities stored in the data source. The UDSA DLL creates these keys, and they are valid for the duration of an open connection. Functions such as UDSA_InstanceList return the instance keys of existing instances.

Attributes of existing instances can be read through the API using UDSA_ValueGet and UDSA_ValueSet. An application may have direct access to an instance's attributes by specifying an instance by its key.

Measurement or bulk data is conceptually the same as other attributes, but may be given separate handling functions (e.g., UDSA_ChannelGet, UDSA_ChannelPut, and UDSA_ChannelRowsAppend). Measurement data may be held by the local column objects, which are referenced by measurement quantities and submatrices.

The UDSA DLL and underlying DataCache may include transaction management so that any changes to the data from an application will not be immediately committed to the physical data store. The changes may be applied to the active-memory copy of the data and later written in bulk to the permanent data storage. The application can also undo or cancel such changes if desired.

The application can start a transaction using the UDSA_TransactionBegin function. Each new transaction returns its own unique handle. Changes made within an open transaction may be committed to the data store using the UDSA_TransactionCommit function. The UDSA_TransactionRollback function cancels any changes back to the beginning of a transaction. Multiple transaction markers may be set using the UDSA_TransactionBegin function. The marker to which to roll back changes may be specified to the UDSA_TransactionRollback function. The UDSA_TransactionCommit function may commit all changes from the first transaction marker and remove all transaction markers to this point.

Calling UDSA_TransactionCommit will write the current data state of the DataCache to the data source. In case of an ATF file, the current contents of the file may be overwritten with the data from the DataCache.

Figure 16:
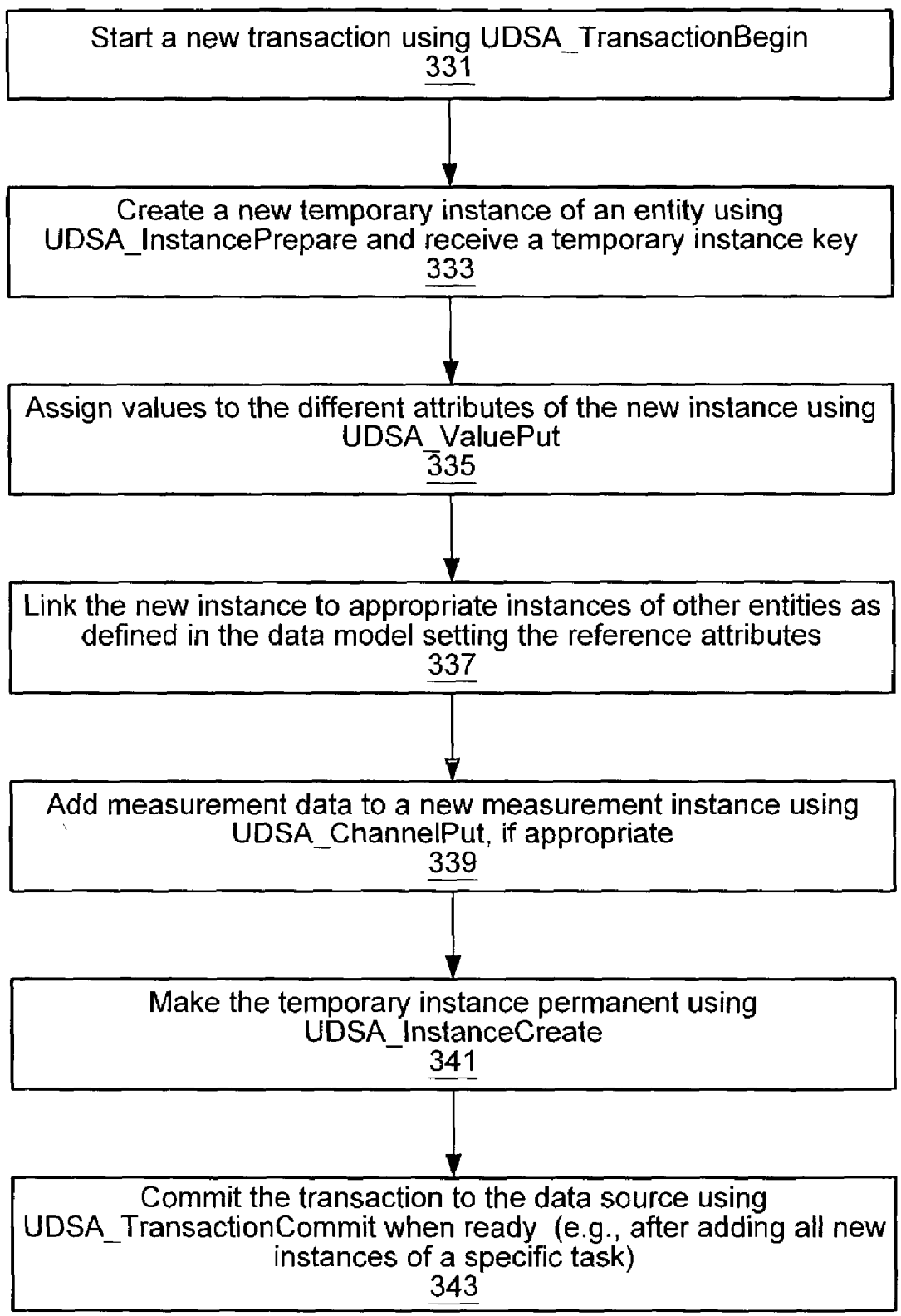
FIG. 16 is a flowchart diagram illustrating a process of inserting a new piece of information into a data source.

To properly insert a new piece information into a data source, the application needs to properly link the new information (instance) to the existing data (instances). FIG. 16 is a flowchart diagram illustrating this process. The process illustrated in FIG. 16 may be used to create new instances.

In 331, a new transaction may be started using UDSA_TransactionBegin.

In 333, a new temporary instance of an entity may be created using UDSA_InstancePrepare. A temporary instance key may be returned.

In 335, values may be assigned to the different attributes of the new instance using UDSA_ValuePut.

In 337, the new instance may be linked to appropriate instances of other entities as defined in the data model setting the reference attributes.

In 339, measurement data may be added to a new measurement instance using UDSA_ChannelPut, if appropriate.

In 341, the temporary instance may be made permanent using UDSA_InstanceCreate. The instance key of the new permanent instance may be returned.

In 343, the transaction may be committed to the data source using USDA_TransactionCommit when ready (e.g., after adding all new instances of a specific task).

UDSA API Functions

This section describes one embodiment of an API for the UDSA DLL. Each function in the API returns a status code as an integer value, indicating whether the function completed successfully or what type of error occurred. These status codes are described in the following table. The status codes can also be converted with a program into a descriptive string using the UDSA_GetStatusMessage function.

| Status/Error Code | Message |
| --- | --- |
| 0 | NO_ERROR: The operation completed successfully. |
| 100 | GLOBAL_ERROR: A global error occurred (e.g. Not enough memory). |
| 101 | ILLEGAL_HANDLE: The data source handle is invalid. |
| 104 | SERVER_ERROR: No connection to the ASAM-ODS server could be established. |
| 105 | USER_UNKNOWN: The specified user is unknown or the password is invalid. |
| 106 | ROLLBACK_ERROR: There was an error in rollback of the transaction. |
| 107 | ILLEGAL_KEY: The specified instance key is invalid or the specified instance is not a measurement or measurement quantity. |
| 108 | ATTRIB_NOT_FOUND: The specified instance does not contain the desired attribute. |
| 110 | ILLEGAL_TYPE: The specified data type is invalid or a type conversion could not be completed. |
| 112 | ENTITY_NOT_FOUND: The specified entity could not be found. |
| 113 | ILLEGAL_CONFIG: The specified instance browser configuration is invalid. |
| 114 | ILLEGAL_TRANS_NR: The specified transaction number is invalid. |
| 115 | ILLEGAL_UNIT (=115): The specified unit can not be interpreted correctly. |
| 116 | ILLEGAL_ERROR_NR: The specified status number is invalid. |
| 117 | CANCELED_BY_USER: The user canceled the operation in the dialog. |
| 118 | ILLEGAL_INDEX: The data source index is invalid. |
| 124 | SOURCE_ERROR: The data source does not support this operation. |
| 127 | ILLEGAL_QUANTITY: The specified quantity can not be interpreted correctly. |
| 128 | ILLEGAL_PARAMETER: The specified parameter is not known. |
| 200 | FILE_ERROR: The specified file could not be found or opened. |

The functions of the UDSA interface are organized into different groups according to their functionality. The following function groups and the individual functions are listed and described in alphabetical order.

Global Parameters: Functions to set and read global parameters and status information that describe or define the connection with a data source

| | |
| --- | --- |
| UDSA_ParameterSet | Set global parameters |
| UDSA_ParameterGet | Get global parameters |
| UDSA_SourceCount | Get count of open data sources |
| UDSA_SourceHandleGet | Get handle of open data sources |

Data Source Connection Handling: Functions to open and close data sources, to save ATF files and data model files, and generally manage data source connections

| | |
| --- | --- |
| UDSA_SourceOpen | Open a data source |
| UDSA_SourceClose | Close a data source |
| UDSA_SourceSaveAs | Store data in another format |
| UDSA_ModelSave | Store data model |

-continued

| | |
|---|---|
| UDSA_SourceTypeGet | Get type of data source |
| UDSA_SourceParameterGet | Get data source parameters |
| UDSA_DataCachePointerGet | Get pointer to the DataCache of open data source |

Access to the Data Model (Metadata): Functions to access elements and attributes in the data model

| | |
|---|---|
| UDSA_EntityList | List all elements in data source (data model) |
| UDSA_AttributeList | List attributes of an element |
| UDSA_BaseEntityGet | Get base type of an element |
| UDSA_SubEntititesGet | Get subtypes of an element |
| UDSA_BaseAttributeGet | Get base attribute of an application attribute |
| UDSA_AttributeTypeGet | Get data type of an attribute |

Instance and Instance-Key Handling: Functions to list, create and delete instances

| | |
|---|---|
| UDSA_InstanceCount | Get number of instances of an element |
| UDSA_InstanceList | List instances of an element |
| UDSA_InstancePrepare | Prepare a new instance |
| UDSA_InstanceCreate | Create a new instance |
| UDSA_InstanceDel | Delete an instance |
| UDSA_KeyCreate | Create an instance key |
| UDSA_KeyInfo | Get instance key information |

Access to Values (Data): Functions to read and write measurement data and attribute values

| | |
|---|---|
| UDSA_ChannelGet | Read measurement data |
| UDSA_ChannelPut | Write measurement data |
| UDSA_ChannelRowsAppend | Append measurement data |
| UDSA_ValueGet | Read attribute value |
| UDSA_ValuePut | Write attribute value |
| UDSA_ValuesCount | Get count of attribute values |

Transaction Handling: Functions to start, commit, and cancel transactions

| | |
|---|---|
| UDSA_TransactionBegin | Begin transaction/set new transaction marker |
| UDSA_TransactionCommit | Commit transaction |
| UDSA_TransactionRollback | Cancel transaction/revert to marker |

Service Functions: Service functions of the ASAM-ODS DLL

| | |
|---|---|
| UDSA_ValuesFree | Release memory allocated by the DLL |
| UDSA_StatusMessageGet | Get error message string |
| UDSA_SourceBrowse | Display ASAM Navigator dialog window for data source |

UDSA ParameterSet long UDSA_ParameterSet (const char* szParameters)

Sets global parameters that configure the UDSA interface and connections to the data sources.

szParameters: String containing global parameters of the connection interface

This function sets the global parameters of the connection interface of the UDSA DLL. Parameters are passed in a string with each parameter (attribute) identified by its name, followed by an equal ('=') symbol, the parameter value, and a semicolon (e.g. IniFile=IniFileName;).

The following parameters are defined by the following:

IniFile: Name of the INI file used to store global connection parameters.

The descriptions of the return values are listed in the status code table above.

UDSA ParameterGet long UDSA_ParameterGet (char** pszParameters)

Gets the values of the global parameters that are set for the UDSA interface.

pszParameters: String containing global parameters of the connection interface. If no parameters are available to be returned this variable is not changed.

This function is used to get the current value of the global parameters of the connection interface of the UDSA DLL. Parameters are returned in a string with each parameter (attribute) identified by its name, followed by an equal ('=') symbol, the parameter value, and a semicolon (e.g. IniFile=IniFileName;). The meaning of the different parameters is described in the UDSA_ParameterSet function.

The memory for the output string pszParameters is allocated in this function and must be released by the calling program using the UDSA_ValuesFree function (UDSA_ValuesFree(eStringDa, 1,pszParameters)).

The descriptions of the return values are listed in the status code table above.

UDSA SourceCount long UDSA_SourceCount(long* lSourceCount)

Returns the number of open data sources.

lSourceCount: Number of open data sources

The descriptions of the return values are listed in the status code table above.

| UDSA SourceHandleGet | | |
|---|---|---|
| long UDSA_SourceHandleGet | (long | lSourceIndex, |
| | long* | lSourceHandle) |

Returns the handle of the open data source identified by its index.

| | |
|---|---|
| lSource Index | : Index of the data source for which to return the handle. The index is 1 based. |
| lSourceHandle | : Data source handle |

Note: The index of a data source is temporary and will be different every time the source connection is opened or closed.

The descriptions of the return values are listed in the status code table above.

| UDSA SourceOpen | | |
|---|---|---|
| long UDSA_SourceOpen | ( tSourceType<br>const char*<br>BOOL<br>HWND<br>long* | cSourceType,<br>szParameters,<br>bShowDialog,<br>hwndParent,<br>lSourceHandle) |

Opens a data source with the specified parameters. Returns a handle to the opened data source.

| | |
|---|---|
| cSourceType | : Type of data source (EXPRESS, ATF, AOP) |
| szParameters | : Parameters for opening data source |
| bShowDialog | : Show dialog for selecting file name |
| hwndParent | : Handle of the parent window of the Select Filename dialog |
| lSourceHandle | : New handle of the data source |

This function opens a data source according to the type specified. The handle of the opened data source is returned in lSourceHandle and is passed to other functions working with this data source.

Possible values for cSourceType are:

| | |
|---|---|
| cSourceType = eEXP | : Open an EXPRESS file |
| cSourceType = eATF | : Open an ATF file |
| cSourceType = eAOP | : Open an ASAM-ODS (AOP3) server | szParameters passes the parameters for opening the data source, which are dependent on the type of data source. Multiple parameters are passed in the string identified by name followed by an equals symbol and separated by semicolons.

The following parameters are valid in szParameters when opening an ATF or data model file:
File name (Filename=)
Logical name of the data source (SourceName=)
Log file name (LogFile=)

e.g., Filename=FileName; SourceName=SourceName; LogFile=LogFileName If no dialog should be displayed (bShowDialog=FALSE) a file name (Filename=) must be specified. The other parameters are optional.

When opening an ASAM-ODS (AOP) server the following parameters can be specified in szParameters:
Server name (Server=)
RPC Number of the server (RPC=)
User name (User=)
Password (Pwd=)
Map file name (MapFile=)
Logical name of the data source (SourceName=)
Log file name (LogFile=)

e.g., Server=Servername; RPC=RPC-Nummer; User User; Pwd=Passwort; MapFile=MapFileName; SourceName=SourceName The parameter MapFileName specifies a map file name which contains a data model and can correct the data model in an ASAM-ODS server.

If no dialog should be displayed (bshowDialog=FALSE) an ASAM-ODS server providing a server name, a RPC number user name, and a password must be specified. The other parameters are optional.

The bShowDialog parameter can be used to show a dialog to set parameters when opening a data source. The dialog is opened as a child of the window specified with hwndparent. The hwndParent can be set to NULL to open the dialog relative to the desktop.

The parameters in the dialog are preset from values in szparameters. Missing parameters are filed in with the most recent values used with this data source type. These settings are stored in the global INI file (used with UDSA_ParameterSet). Parameters set or changed by the user can be read back using the UDSA_SourceParameterGet function.

The lSourceHandle variable returns the handle of the opened data source. This handle accesses the data, metadata, and attributes of the data source.

The descriptions of the return values are listed in the status code table above.

UDSA SourceClose long UDSA_SourceClose (long lSourceHandle)

Closes an open data source.

lSourceHandle: Data source handle

If lSourceHandle references an open data source connection, the connection is closed. Any data or attribute changes not committed are lost.

If a Null value for the handle (lSourceHandle=0) is passed, all open data source connections will be closed.

The descriptions of the return values are listed in the status code table above.

| UDSA SourceSaveAs | | |
|---|---|---|
| long UDSA_SourceSaveAs | ( tSourceType<br>const char*<br>BOOL<br>HWND<br>long* | cSourceType,<br>szParameters,<br>bShowDialog,<br>hwndParent,<br>lSourceHandle) |

Stores a data source with new parameters or under a different data source type.

| | |
|---|---|
| cSourceType | : Data source type (currently only eATF) |
| szParameters | : Parameters to store ATF file |
| bShowDialog | : TRUE: Displays dialog to enter file name |
| hwndParent | : Handle of the parent window |
| lSourceHandle | : Data source handle |

If the original data source type is different from the specified type, the source in the DataCache is changed to the new type and then saved with the new parameters. Currently this function can change EXP and ATF data sources to an ATF source with new parameters. If the original source is a data model (EXPRESS file), the type is changed to ATF and the contents of the DataCache are stored as an ATF file according to the parameters in szParameters. If the original source is an ATF file the contents of the DataCache is stored as an ATF file according to the parameters in szParameters. If the data source is an ASAM-ODS (AOP) server, an error message (GLOBAL_ERROR ) is generated. Subsequent calls to UDSA_TransactionCommit will save any changes to the data source with the new parameters.

The szParameters variable is used to pass parameters for saving data to an ATF file. The individual parameters are identified by name followed by an equals sign and with a semicolon as delimiter.

Valid parameters include
File name (File=)
Logical data source name (SourceName=)
Option to store measurement data as separate binary files (BinaryFiles=)
Option to store security information (Security=)

e.g. File=FileName; SourceName=SourceName; LogFile=LogFileName; BinaryFiles=TRUE; Security=TRUE.

To speed up reading and writing data and to save disk space, the ASAM-ODS DLL can store measurement data in separate binary files, which are linked to the ATF file. This option is part of the ASAM-ODS specification and can be selected with the BinaryFiles=TRUE parameter. Without this option binary files are not created.

When reading ATF files with linked binary data files, it is not necessary to specify this option because the DLL automatically detects and handles binary data files.

If the data source contains security information it is only stored if the Security=TRUE option is set.

If no dialog needs to be displayed to enter the parameter values, the bShowDialog=FALSE option should be set and a file name must be specified. The other options are not required.

If no logical data source name is specified the current name is used.

The bShowDialog option can be used to show a dialog to set parameters when opening a data source. The dialog is opened as a child of the window specified with hwndparent. The hwndParent can be set to NULL to open the dialog relative to the desktop.

The descriptions of the return values are listed in the status code table above.

UDSA ModelSave

| long UDSA_ModelSave | ( const char* | szModelFileName, |
|---|---|---|
| | tSourceType | cSourceType, |
| | BOOL | bShowDialog, |
| | char** | pszUserFileName, |
| | tSourceType* | cUserSourceType, |
| | HWND | hwndParent, |
| | long | lSourceHandle) |

Stores the data model of the data source in a file.

| szModelFileName | : Data model filename |
|---|---|
| cSourceType | : Data model file type: EXPRESS, ATF |
| bShowDialog | : TRUE: Display dialog to enter filename |
| pszUserFileName | : User selected data model filename |
| cUserSourceType | : User select data model file type: EXPRESS, ATF |
| hwndParent | : Handle of the parent window |
| lSourceHandle | : Data source handle |

The cFilerType variable selects which file format stores the data model.

Valid values include:

| cSourceType = eEXP | : Store data model as an EXPRESS file |
|---|---|
| cSourceType = eATF | : Store data model as an ATF file | pszUserFileName and cUserSourceType return user-selected values for the file name and file type. If no dialog is displayed these two variables return the settings from the functions call.

The bShowDialog option can be used show a dialog to set parameters when opening a data source. The dialog is opened as a child of the window specified with hwndparent. The hwndParent can be set to NULL to open the dialog relative to the desktop.

The memory for the output string pszUserFileName is allocated in this function and must be released by the calling program using the UDSA_ValuesFree function (UDSA_ValuesFree(eStringDa, 1, pszUserFileName)).

The descriptions of the return values are listed in the status code table above.

UDSA SourceTypeGet

| long UDSA_SourceTypeGet | ( tSourceType* | cSourceType, |
|---|---|---|
| | long | lSourceHandle) |

Gets information about the data source type.

| cSourceType | : Data source type (EXPRESS, ATF, AOP) |
|---|---|
| lSourceHandle | : Data source handl |

Possible values for cSourceType:

| cSourceType = eEXP | : Data source is an EXPRESS file |
|---|---|
| cSourceType = eATF | : Data source is an ATF file |
| cSourceType = eAOP | : Data source is an ASAM-ODS (AOP) server |

The descriptions of the return values are listed in the status code table above.

UDSA SourceParameterGet

| long UDSA_ParameterGet | ( char** | pszParameters, |
|---|---|---|
| | long | lSourceHandle) |

Returns the parameters used to open (UDSA_SourceOpen) the data source.

| pszParameters | : Parameters used to open the data source |
|---|---|
| lSourceHandle | : Data source handle |

The memory for the output string pszparameters is allocated in this function and must be released by the calling program using the UDSA_ValuesFree function (UDSA_ValuesFree(eStringDa, 1, pszParameters)).

The descriptions of the return values are listed in the status code table above.

| UDSA DataCachePointerGet | | |
|---|---|---|
| long UDSA__DataCachePointerGet | (long* | pDataCache, |
| | long | lSourceHandle) |

Returns a pointer to the database in the DataCache, which is used for the data source referenced by this handle.

| pDataCache | : Pointer to the database in the DataCache |
|---|---|
| lSourceHandle | : Data source handle |

The pointer to the database becomes invalid when the connection to the data source is closed, since all objects and data in the DataCache pertaining to this data source will be deleted at this point. The pointer to the database can be passed to the ASAM Navigator to browse the hierarchy and view the instances of the data source.

The descriptions of the return values are listed in the status code table in this manual.

| UDSA TransactionBegin | | |
|---|---|---|
| long UDSA__TransactionBegin | ( long* | lTransactionId, |
| | long | lSourceHandle) |

Marks the beginning of a transaction.

| lTransactionId | : Transaction Number |
|---|---|
| lSourceHandle | : Data source handle |

The DataCache can combine multiple operations manipulating attributes in a single transaction. The beginning of a transaction is marked with the UDSA_TransactionBegin function. The end of a transaction is marked by the UDSA_TransactionCommit function at which point all the changes in attributes is committed to the data source. The UDSA_TransactionRollback function can rollback (undo) any of the changes back to the beginning of a transaction if they have not been committed yet. The value of variables and parameters is not affected.

The UDSA_TransactionBegin function can be used to mark multiple transaction points. Multiple transaction markers can be used to rollback changes to a specific point in a series of operations. UDSA_TransactionCommit will commit all changes back to the first transaction marker.

The descriptions of the return values are listed in the status code table above.

UDSA TransactionCommit long UDSA_TransactionCommit (long lSourceHandle)

Marks the end of a transaction and closes all transaction markers. Changes in the data source during the transaction since the first marker will be committed (saved) to the data source.

lSourceHandle: Data source handle

Calling UDSA_TransactionCommit will close all transaction markers to this point for this data source. Changes for this data source will be committed and saved to the data source.

If the data source is an ASAM-ODS (AOP) server, the data currently stored in the DataCache will be written to the server. If the data source is an ATF file the data currently stored in the DataCache will be written to the ATF file. The current contents of the ATF will be lost.

The descriptions of the return values are listed in the status code table above.

| UDSA TransactionRollback | | |
|---|---|---|
| long UDSA__TransactionRollback | ( long | lTransactionId, |
| | long | lSourceHandle) |

Rolls back (undo) changes made during the transaction back to the specified transaction number (marker).

| lTransactionId | : Transaction number |
|---|---|
| lSourceHandle | : Data source handle |

The descriptions of the return values are listed in the status code table above.

| UDSA ChannelGet | | |
|---|---|---|
| long UDSA__ChannelGet | ( const char* | szInstanceKey, |
| | long* | lChannelCount, |
| | tChannel** | poChannel, |
| | long | lSourceHandle) |

Reads measurement data from a data source.

| szInstanceKey | : Instance key for a measurement or measurement quantity |
|---|---|
| lChannelCount | : Number of measurement quantities (channels) |
| poChannel | : List of measurement data structures for each measurement quantity |
| lSourceHandle | : Data source handle |

If szInstanceKey references a measurement, the data for all measurement quantities of this measurement (including the guide channel) will be sorted according to the guide channel and will be put into the measurement data. For each measurement quantity a measurement data structure (tChannel) will be created.

If szInstanceKey references a list of measurement quantities, the data for all listed measurement quantities will be sorted according to the guide channel, and put into the measurement data. For each listed measurement quantity a measurement data structure (tChannel) will be created. All measurement quantities in the list must be in one measurement. The list of measurement quantities is a multiple Null-terminated string.

If szInstanceKey references a single measurement quantity, the data of the measurement quantity will be sorted according to the guide channel and put into the measurement data. A measurement data structure (tChannel) will be created.

The measurement data structures for each measurement quantity is defined as follows:

```
typedef struct _tChannel {
    char*       szMeaqKey;
    char*       szUnitKey;
    char*       szQuantityKey;
    tDataType   cValueType;
    BOOL        bIndepFlag;
    tChnType    cChnType;
    long        lParamsCount;
    double*     dGenParameters;
    long        lValuesCount;
    void*       pValues;
    short*      pFlags;
} tChannel
```

| | |
|---|---|
| szMeaqKey | : Instance key for the measurement |
| szUnitKey | : Instance key for the unit |
| szQuantityKey | : Instance key for the quantity |
| cValueType | : Data type in the measurement |
| bIndepFlag | : TRUE: independent (guide) channel, otherwise FALSE |
| cChnType | : Channel type (explicit, implicit, . . . ) |
| lParamsCount | : Number of parameters (for future extensions) |
| dGenParameters | : Array of parameters (for future extensions) |
| lValuesCount | : Number of data values in the buffer |
| pValues | : Data buffer |

The enumeration type for the channel type is defined as follows:

```
typedef enum _tChnType
{
    eNoTypChn,
    eExplizit,
    eImplicit_constant,
    eImplicit_linear,
    eImplicit_saw,
    eRaw_linear,
    eRaw_polynomial,
    eFormula
} tChnType;
```

The enumeration type for the data type is defined as follows:

```
typedef enum _tDataType
{
    eNoTypOds,
    eByteOds,
    eI16Ods,
    eI32Ods,
    eI64Ods,
    eR32Ods,
    eR64Ods,
    eTimeOds,
    eStringOds,
    eInstOds,
    eBlobOds,
    eChannelOds
} tDataType;
```

Except for text/string data, the size of the value buffer pValues in bytes:

*lValuesCount\*sizeof(cValueType)*

Texts/strings are passed as multiple Null-terminated strings. lValuesCount contains the number of returned strings in pValues.

The memory for the measurement data structures referenced in poChannel as well as the data buffers pvalues in the structures is allocated in this function and must be released by the calling program using the UDSA_ValuesFree function (UDSA_ValuesFree(eChannelDa, lChannelCount, poChannel)).

The descriptions of the return values are listed in the status code table above.

---

UDSA ChannelPut

```
long UDSA_ChannelPut ( const char* szInstanceKey,
                              long        lChannelCount,
                              tChannel*   poChannel,
                              long        lSourceHandle)
```

Stores measurement data in a data source.

---

| | |
|---|---|
| szInstanceKey | : Instance key for a measurement |
| lChannelCount | : Number of measurement quantities (Channels) |
| poChannel | : List of measurement data structures for measurement quantities |
| lSourceHandle | : Data source handle |

The number of measurement quantities of this measurement (szInstanceKey) to be written is specified in lChannelCount. The measurement data structures referenced in poChannel contains the necessary parameters for storing the measurement data.

The measurement data structures for each measurement quantity is defined by the following:

```
typedef struct _tChannel {
    char*       szMeaqKey;
    char*       szUnitKey;
    char*       szQuantityKey;
    tDataType   cValueType;
    BOOL        bIndepFlag;
    tChnType    cChnType;
    long        lParamsCount;
    double*     dGenParameters;
    long        lValuesCount;
    void*       pValues;
    short*      pFlags;
} tChannel
```

| | |
|---|---|
| szMeaqKey | : Instance key for the measurement |
| szUnitKey | : Instance key for the unit |
| szQuantityKey | : Instance key for the quantity |
| cValueType | : Data type in the measurement |
| bIndepFlag | : TRUE: independent (guide) channel, otherwise FALSE |
| cChnType | : Channel type (explicit, implicit, . . . ) |
| lParamsCount | : Number of parameters (for future extensions) |

-continued

| | |
|---|---|
| dGenParameters | : Array of parameters (for future extensions) |
| lValuesCount | : Number of data values in the buffer |
| pValues | : Data buffer |

The enumeration type for the channel type is defined by the following:

```
typedef enum _tChnType
{
    eNoTypChn,
    eExplizit,
    eImplicit_constant,
    eImplicit_linear,
    eImplicit_saw,
    eRaw_linear,
    eRaw_polynomial,
    eFormula
} tChnType;
```

The enumeration type for the data type is defined by the following:

```
typedef enum _tDataType
{
    eNoTypOds,
    eByteOds,
    eI16Ods,
    eI32Ods,
    eI64Ods,
    eR32Ods,
    eR64Ods,
    eTimeOds,
    eStringOds,
    eInstOds,
    eBlobOds,
    eChannelOds
} tDataType;
```

Except for text/string data, the size of the value buffer pvalues in bytes is

*lValuesCount\*sizeof(cValueType)*

Texts/strings are passed as multiple Null-terminated strings. lValuesCount contains the number of returned strings in pValues.

The descriptions of the return values are listed in the status code table above.

---

UDSA ChannelRowsAppend

```
long UDSA_ChannelRowAppend ( const char* szInstanceKey,
                             long         lChannelCount,
                             long         lRowsCount
                             tChannel*    poChannel,
                             long         lSourceHandle)
```

Appends (rows of) data to existing measurements/measurement quantities (partial matrix)

| | |
|---|---|
| szInstanceKey | : Instance key of a measurement |
| lChannelCount | : Number of measurement quantities (channels) |
| lRowsCount | : Number of rows |
| poChannel | : Measurement data for the measurement quantities |
| lSourceHandle | : Data source handle |

The szInstanceKey parameter specifies the measurement to which the data is appended. The lChannelCount and lRowsCount parameters specify the number of channels (measurement quantities) and rows to write.

The measurement data structures for each measurement quantity is defined as follows:

```
typedef struct _tChannel {
    char*      szMeaqKey;
    char*      szUnitKey;
    char*      szQuantityKey;
    tDataType  cValueType;
    BOOL       bIndepFlag;
    tChnType   cChnType;
    long       lParamsCount;
    double*    dGenParameters;
    long       lValuesCount;
    void*      pValues;
    short*     pFlags;
} tChannel
```

| | |
|---|---|
| szMeaqKey | : Instance key for the measurement |
| szUnitKey | : Instance key for the unit |
| szQuantityKey | : Instance key for the quantity |
| cValueType | : Data type in the measurement |
| bIndepFlag | : TRUE: independent (guide) channel, otherwise FALSE |
| cChnType | : Channel type (explicit, implicit, . . . ) |
| lParamsCount | : Number of parameters (for future extensions) |
| dGenParameters | : Array of parameters (for future extensions) |
| lValuesCount | : Number of data values in the buffer |
| pValues | : Data buffer |

The enumeration type for the channel type is defined by the following:

```
typedef enum _tChnType
{
    eNoTypChn,
    eExplicit,
    eImplicit_constant,
    eImplicit_linear,
    eImplicit_saw,
    eRaw_linear,
    eRaw_polynomial,
    eFormula
} tChnType;
```

The enumeration type for the data type is defined by the following:

```
typedef enum _tDataType
{
    eNoTypOds,
    eByteOds,
    eI16Ods,
    eI32Ods,
    eI64Ods,
```

```
        eR32Ods,
        eR64Ods,
        eTimeOds,
        eStringOds,
        eInstOds,
        eBlobOds,
        eChannelOds
    } tDataType;
```

Except for text/string data, the size of the value buffer pValues in bytes is:

*lValuesCount\*sizeof(cValueType)*

Texts/strings are passed as multiple Null-terminated strings. lValuesCount contains the number of returned strings in pValues.

Using this function requires detailed knowledge of the data source, its data model, and the data already stored in the data source. All measurement quantities specified in this function must be in one partial matrix (linked group of channels in one measurement). The function automatically determines which partial matrix in the specified measurement contains all the channels. If such a partial matrix cannot be found an error is returned.

If the data source is an ASAM-ODS (AOP) server the data from this function is directly written to the server. It is not buffered in the transaction mechanism of the DLL. The change cannot be rolled back with UDSA_TransactionRollback. Therefore, all prior changes to the attributes and data in the data source should be committed with UDSA_TransactionCommit before using this function to avoid any inconsistencies in the data.

The descriptions of the return values are listed in the status code table above.

| UDSA ValueGet | | |
|---|---|---|
| long UDSA_ValueGet ( | const char* | szInstanceKey, |
| | const char* | szAttributeName, |
| | const char* | szUnitKey, |
| | long | lStartIndex, |
| | long* | lValuesCount, |
| | tDataType | cValueType, |
| | void** | ppValues, |
| | long | lSourceHandle) |

Reads attribute values from a data source.

| | |
|---|---|
| szInstanceKey | Instance key |
| szAttributeName | Attribute name |
| szUnitKey | Instance key of the desired units |
| lStartIndex | Index of the first attribute |
| lValuesCount | Number of attributes |
| cValueType | Data type of attribute |
| ppValues | Data buffer |
| lSourceHandle | Data source handle |

The szInstanceKey parameter is used to pass an instance key or list of instance keys.

The szAttributeName parameter is used to pass the name of the attribute to read.

The szunitKey parameter is used to specify an instance key to a unit in which the attribute is to be returned. If the unit is not specified (szUnitKey=NULL) the default unit for the attribute will be used. If the attribute does not include a unit this parameter is ignored. The unit of the attribute can be determined with the UDSA_AttributeTypeGet function. If the specified unit is unknown or the attribute cannot be converted to the desired unit, an error is returned.

The lStartIndex parameter specifies the index of the first attribute value to read. It is 1-based.

The lValuesCount parameter specifies the number of attribute values to read. The value may be set to −1 to read all values from the start value. After the function returns this variable contains the actual number of attribute values read.

The cValueType parameter specifies the data type of the buffer containing the attribute values after this function call. If the specified type does not match the data type of the attribute an automatic type conversion will be done.

The attribute values are returned in the pvalues buffer. The memory for pvalues will be allocated by this function and must be released by the calling program using the UDSA_ValuesFree function (UDSA_ValuesFree (cValueType, lValuesCount, ppvalues)).

For each instance key in szInstanceKey blocks containing lValuesCount values will be copied. If a specified attribute contains less than lValuesCount values, missing values will be filled in with null or an empty string. This function works in a block operation mode.

Text and instance keys are passed as multiple null-terminated strings. lValuesCount contains the number of passed strings or instance keys.

The enumeration type for the data type is defined as follows:

```
        typedef enum _tDataType
        {
            eNoTypOds,
            eByteOds,
            eI16Ods,
            eI32Ods,
            eI64Ods,
            eR32Ods,
            eR64Ods,
            eTimeOds,
            eStringOds,
            eInstOds,
            eBlobOds,
            eChannelOds
        } tDataType;
```

Except for text/string data, the size of the value buffer pValues in bytes is:

*lValuesCount\*sizeof(cValueType)*

Texts/strings are passed as multiple Null-terminated strings. lValuesCount contains the number of returned strings in pvalues.

The descriptions of the return values are listed in the status code table above.

| UDSA ValuePut | | |
|---|---|---|
| long UDSA_ValuePut ( | const char* | szInstanceKey, |
| | const char* | szAttributeName, |
| | const char* | szUnitKey, |
| | long | lStartIndex, |
| | long | lValuesCount, |
| | tDataType | cValueType, |
| | void* | pValues, |
| | long | lSourceHandle) |

Writes attribute values to the specified data source.

| | |
|---|---|
| szInstanceKey | Instance key |
| szAttributeName | Attribute name |
| szUnitKey | Instance key of the unit |
| lStartIndex | Index of the first attribute value |
| lValuesCount | Number of values in the buffer |
| cValueType | Data type in the value buffer |
| pValues | Buffer containing attribute values |
| lSourceHandle | Data source handle |

The szInstanceKey parameters is used to pass an instance key.

The szAttributeName parameters is used to pass the name of the attribute to write.

The szunitKey parameters is used to specify an instance key to the unit for the attribute. If no unit is specified (szUnitKey=NULL), the default unit for the attribute will be used. If the attribute does not include a unit, this parameter is ignored. The unit of an attribute can be determined with the UDSA_AttributeTypeGet function. If the specified unit is unknown or the attribute cannot be converted to the desired unit, an error is returned.

The lStartIndex parameter specifies the index of the first attribute value to write. It is 1-based.

The lValuesCount parameter specifies the number of attribute values to write.

The cValueType parameter specifies the data type of the buffer containing the attribute values. If the specified type does not match the data type of the attribute an automatic type conversion will be done.

The attribute values to be written are passed in pValues.

Text and instance keys are passed as multiple Null-terminated strings. lValuesCount contains the number of passed strings or instance keys.

The enumeration type for the data type is defined as follows:

```
typedef enum _tDataType
{
    eNoTypOds,
    eByteOds,
    eI16Ods,
    eI32Ods,
    eI64Ods,
    eR32Ods,
    eR64Ods,
    eTimeOds,
    eStringOds,
    eInstOds,
    eBlobOds,
    eChannelOds
} tDataType;
```

Except for text/string data, the size of the value buffer pvalues in bytes is:

*lValuesCount*sizeof(cValueType)*

Values written with UDSA_ValuePut are only temporary in memory. To save these changes in the data source, the UDSA_TransactionCommit function is called to commit the changes.

If UDSA_ValuePut is used to write attribute values on a temporary instance (see UDSA_InstancePrepare), they will be written to the data source when UDSA_InstanceCreate is called and the instance is actually created.

The descriptions of the return values are listed in the status code table above.

| UDSA ValuesCount | | |
|---|---|---|
| long UDSA_ValuesCount | ( const char* | szInstanceKey, |
| | const char* | szAttributeName, |
| | long* | lValuesCount, |
| | long | lSourceHandle) |

Returns the number of values of an attribute.

| | |
|---|---|
| szInstanceKey | Instance key |
| szAttributeName | Attribute name |
| lValuesCount | Number of attribute values |
| lSourceHandle | Data source handle |

The descriptions of the return values are listed in the status code table above.

| UDSA_InstanceCount | | |
|---|---|---|
| long UDSA_Instance Count | ( const char* | szEntityName, |
| | const char* | szFilter, |
| | long* | lInstCount, |
| | long | lSourceHandle) |

Returns number of instances of a given entity (element), which satisfy the filter specification.

| | |
|---|---|
| szEntityName | Entity name |
| szFilter | Filter expression |
| lInstCount | Number of instances |
| lSourceHandle | Data source handle |

The filter szFilter has the following format: "Attributename1=Value1; Attributename2=Value2; . . . AttributenameN=ValueN". All filter parameters are ANDed.

The wild card for a single character is '_'; the wild card for multiple characters is '%'.

The descriptions of the return values are listed in the status code table above.

| UDSA InstanceList | | |
|---|---|---|
| long UDSA_InstanceList | ( const char* | szEntityName, |
| | const char* | szFilter, |
| | long* | lInstCount, |
| | char** | pszInstKeys, |
| | long | lSourceHandle) |

Lists instances of an entity (element) matching a given filter expression.

| | |
|---|---|
| szEntityName | Entity name |
| szFilter | Filter expression |
| lInstCount | Number of instances |

-continued

| | |
|---|---|
| pszInstKeys | List of instance keys |
| lSourceHandle | Data source handle |

The pszInstKeys parameter returns the instance keys which match the filter expression. Individual instance keys are separated by a null character in a multiple null-terminated string.

The filter szFilter has the following format: "Attributename1=Value1; Attributename2=Value2; . . . AttributenameN=ValueN". All filterparameters are ANDed.

The wild card for a single character is '_'; the wild card for multiple characters is '%'.

The memory for pszInstKeys will be allocated by this function and must be released by the calling program using the UDSA_ValuesFree function (UDSA_ValuesFree(eInst Ods, lInstCount, pszInstKeys)).

The descriptions of the return values are listed in the status code table above.

| UDSA InstancePrepare | | |
|---|---|---|
| long UDSA_InstancePrepare | ( const char* | szEntityName, |
| | char** | pszTempInstKey, |
| | long | lSourceHandle) |

Prepares a new instance to be written to a data source

| | |
|---|---|
| szEntityName | Entity name |
| pszTempInstKey | Temporary instance key |
| lSourceHandle | Data source handle |

When creating a new instance of an entity to be stored in the data source, the new instance is first prepared in memory, before being created in the data source. A temporary instance is created, and then attributes are added to the temporary instance. Once the temporary instance is complete it is created using the UDSA_InstanceCreate function.

The temporary instance key is returned in pszTempInstKey. This temporary instance key sets attributes on the instance such as required attributes which need to be set before the instance can be created in an ASAM-ODS (AOP) server. Calling UDSA_InstanceCreate or UDSA_TransactionCommit will create the temporary instance in the ASAM-ODS (AOP) server.

The memory for pszTempInstKey will be allocated by this function and must be released by the calling program using the UDSA_ValuesFree function (UDSA_ValuesFree(eInst Ods, 1, pszTempInstKey)).

The descriptions of the return values are listed in the status code table above.

| UDSA InstanceCreate | | |
|---|---|---|
| long UDSA_InstanceCreate | (const char* | szTempInstKey, |
| | char** | pszInstKey, |
| | long | lSourceHandle) |

Creates the new instance previously prepared with UDSA_InstancePrepare.

| | |
|---|---|
| szTempInstKey | : Temporary instance key |
| pszInstKey | : Instance key |
| lSourceHandle | : Data source handle |

The temporary instance specified by szTempInstKey will be permanently created in the data source. The instance key of the new instance is returned in pszInstKey.

The memory for pszInstKey will be allocated by this function and must be released by the calling program using the UDSA_ValuesFree function (UDSA_ValuesFree(eInst Ods, 1, pszInstKey)).

To create a new instance of an entity in an ASAM-ODS (AOP) server, certain attributes of the instance must be set (Not-Null attributes), otherwise an error is generated. These attributes are defined in the data model of the data source. When the new instance is created in the server a new instance ID is generated, which is returned by the function in pszInstKey and must be used to specify this instance from then on.

The descriptions of the return values are listed in the status code table above.

| UDSA InstanceDelete | | |
|---|---|---|
| long UDSA_InstanceDelete | ( const char* | szInstKey, |
| | long | lSourceHandle) |

Deletes an instance of an entity.

| | |
|---|---|
| szInstKey | : Instance key |
| lSourceHandle | : Data source handle |

The instance specified by szInstKey will be temporarily deleted. To make this change permanent, the UDSA_TransactionCommit function may be called.

The descriptions of the return values are listed in the status code table above.

| UDSA KeyCreate | | |
|---|---|---|
| long UDSA_KeyCreate | ( const char* | szEntityName, |
| | const char* | szId, |
| | char** | pszInstKey, |
| | long | lSourceHandle) |

Creates an instance key from the given parameters.

| | |
|---|---|
| szEntityName | : Entity name |
| szId | : Instance ID |
| pszInstKey | : Instance key |
| lSourceHandle | : Data source handle |

A new instance key is generated using the szEntityName and szId parameters and is returned in pszInstKey. This is useful if the ID and entity name are already known or were determined outside of this interface. This function should be used when manually creating an instance key.

If a null data source handle is passed (lSourceHandle=0) the instance key will be generated without being validated with a data source.

The memory for pszInstKey will be allocated by this function and must be released by the calling program using the UDSA_ValuesFree function (UDSA_ValuesFree(eInstods, 1, pszInstKey)).

The descriptions of the return values are listed in the status code table above.

| UDSA KeyInfo | | |
|---|---|---|
| long UDSA__KeyInfo | ( const char* | szInstKey, |
| | char** | pszEntityName, |
| | char** | pszId, |
| | long | lSourceHandle) |

Extracts the information from an instance key.

| | |
|---|---|
| szInstKey | : Instance key |
| pszEntityName | : Entity name |
| pszId | : Instance ID |
| lSourceHandle | : Data source handle |

The instance key in szInstKey will be parsed and the individual information returned from the function.

If a Null data source handle is passed (lSourceHandle=0) the instance key will be generated without being validated with a data source. Therefore the entity name in pszEntityName will not necessarily match an application element name in a given data source.

The memory for pszEntityName and pszId will be allocated by this function and must be released by the calling program using the UDSA_ValuesFree function (UDSA_ValuesFree(eStringOds, 1, pszEntityName); UDSA_ValuesFree (eStringOds, 1, pszId)).

The descriptions of the return values are listed in the status code table above.

| UDSA EntityList | | |
|---|---|---|
| long UDSA__EntityList | ( tModel | cModelType, |
| | long* | lEntitiesCount, |
| | char** | pszEntityNames, |
| | long | lSourceHandle) |

Returns the name of all entities (elements) in the data model of a data source.

| | |
|---|---|
| cModelType | : Entity type (Base or application model) |
| lEntitiesCount | : Number of entities (elements) |
| pszEntityNames | : List of entity names |
| lSourceHandle | : Data source handle |

The cModelType parameter specifies from which data model the function selects the entities it returns.

| | |
|---|---|
| cModelType = eBaseModel | : All elements from the base model |
| cModelType = eApplModel | : All elements from the application model |
| cModelType = eEntireModel | : All elements from both data models |

The enumeration type tModel to select the model type is defined as follows:

```
typedef enum __tModel
{
    eEntireModel,
    eBaseModel,
    eApplModel,
} tModel;
```

The names of the entities are returned as a multiple null-terminated string in pszEntityNames. The memory for pszEntityNames will be allocated by this function and must be released by the calling program using the UDSA_ValuesFree function (UDSA_ValuesFree(eStringOds, lEntitiesCount, lEntitiesCount)).

The descriptions of the return values are listed in the status code table above.

| UDSA AttributeList | | |
|---|---|---|
| long UDSA__AttributeList | ( const char* | szEntityName, |
| | tModel | cModelType, |
| | long* | lAttribsCount, |
| | char** | pszAttribNames, |
| | long | lSourceHandle) |

Lists all the attributes of an entity from a data source.

| | |
|---|---|
| szEntityName | : Entity name |
| cModelType | : Attribute type (Base or application attribute) |
| lAttribsCount | : Number of attributes of this entity (element) |
| pszAttribNames | : List of attributes for this entity |
| lSourceHandle | : Data source handle |

The names of all attributes of the specified entity will be listed in a multiple null-terminated string in pszAttribNames.

The memory for pszAttribNames will be allocated by this function and must be released by the calling program using the UDSA_ValuesFree function (UDSA_ValuesFree (eStringOds, lAttribsCount, pszAttribNames)). The enumeration type tModel for the attribute type is defined by the following:

```
typedef enum __tModel
{
    eEntireModel,
    eBaseModel,
    eApplModel,
} tModel;
```

This can be used to specify what type of attribute (base or application) the function returns.

The descriptions of the return values are listed in the status code table above.

| UDSA BaseEntityGet | | |
|---|---|---|
| long UDSA_BaseEntityGet | ( const char* | szEntityName, |
| | char** | pszBaseTypeName, |
| | long | lSourceHandle) |

Returns the name of the base entity (base type) of a given entity.

| | |
|---|---|
| szEntityName | : Entity name |
| pszBaseTypeName | : Base entity name |
| lSourceHandle | : Data source handle |

If the specified entity is not derived from another entity (no base entity exists) then pszBaseTypeName returns a Null pointer. The memory for pszBaseTypeName will be allocated by this function and must be released by the calling program using the UDSA_ValuesFree function (UDSA_ValuesFree(eStringOds, 1, pszBaseTypeName)).

The descriptions of the return values are listed in the status code table above.

| UDSA SubEntitiesGet | | |
|---|---|---|
| long UDSA_SubEntitiesGet | ( const char* | szEntityName, |
| | long* | lCountEntities, |
| | char** | pszSubTypeNames, |
| | long | lSourceHandle) |

Lists entities (subtypes) derived from a given base or application entity.

| | |
|---|---|
| szEntityName | : Entity name |
| lCountEntities | : Number of derived entities |
| pszSubTypeNames | : List of derived entities |
| lSourceHandle | : Data source handle |

The names of all derived entities will be listed in a multiple null-terminated string in pszSubTypeNames. The memory for pszSubTypeNames will be allocated by this function and must be released by the calling program using the UDSA_ValuesFree function (UDSA_ValuesFree (eStringOds, lCountEntities, pszSubTypeNames)).

The descriptions of the return values are listed in the status code table above.

| UDSA BaseAttributeGet | | |
|---|---|---|
| long UDSA_BaseAttributeGet | ( const char* | szEntityName, |
| | const char* | szAttribName, |
| | char** | pszBaseAttribName, |
| | long | lSourceHandle) |

Returns the name of the base attribute of a given attribute.

| | |
|---|---|
| szEntityName | : Entity name |
| szAttribName | : (Application) attribute name |
| pszBaseAttribName | : Base attribute name |
| lSourceHandle | : Data source handle |

The name of the base attribute of the (application) attribute specified in szAttribName and part of the entity szEntityName is returned in pszBaseAttribName. If the specified attribute is a pure application attribute (not derived from a base attribute) this function returns a Null pointer in pszBaseAttribName. The memory for pszBaseAttribName will be allocated by this function and must be released by the calling program using the UDSA_ValuesFree function (UDSA_ValuesFree(eStringods, 1, pszBaseAttribName)).

The descriptions of the return values are listed in the status code table above.

| UDSA AttributeTypeGet | | |
|---|---|---|
| long UDSA_AttributeTypeGet | ( const char* | szEntityName, |
| | const char* | szAttribName, |
| | char** | pszUnitKey, |
| | tDataType* | cValueType, |
| | char** | pszEntityName, |
| | long | lSourceHandle) |

Return the attribute type of a given attribute.

| | |
|---|---|
| szEntityName | : Entity name |
| szAttribName | : Attribute name |
| pszUnitKey | : Instance key of the attribute unit |
| cValueType | : Attribute type |
| pszEntityName | : Name of a referenced entity |
| lSourceHandle | : Data source handle |

In pszUnitKey an instance key to the unit of the attribute is returned. If the attribute does not have a defined unit a null pointer is returned.

If the specified attribute is a reference to another entity (cvalueType=eInstDa) then the name of the referenced entity is returned in pszEntityName.

The memory for pszunitKey and pszEntityName will be allocated by this function and must be released by the calling program using the UDSA_ValuesFree function (UDSA_ValuesFree(eStringOds, 1, pszUnitKey); UDSA_ValuesFree (eStringOds, 1, pszEntityName)).

The enumeration type of the attribute type tDataType is defined as follows:

```
typedef enum _tDataType
{
    eNoTypDa,
    eByteDa,
    eI16Da,
    eI32Da,
    eI64Da,
    eR32Da,
    eR64Da,
    eTimeDa,
    eStringDa,
```

-continued

```
        eInstDa,
        eBlobDa,
        eChannelOds
    }   tDataType;
```

The descriptions of the return values are listed in the status code table above.

| UDSA ValuesFree | | |
|---|---|---|
| long UDSA_ValuesFree | ( tDataType<br>long<br>void** | cValueType,<br>lCountValues,<br>ppValues) |

Deallocates memory allocated in one of the functions of the DLL.

| cValueType | : Type of data buffer |
|---|---|
| lCountValues | : Number of values in the data buffer |
| ppValues | : Data buffer to be deallocated |

Many functions of this DLL allocate memory to return different information to the calling application. The calling application needs to deallocate this memory when the information is no longer required. This should be done using this function.

The cValueType parameter specifies the data type of the buffer. The lCountValues parameter specifies the number of values in the buffer. The ppvalues parameter specifies a pointer to the buffer to be deallocated. See each of the functions allocating memory for more details on deallocating the memory.

The enumeration type of the data type tDataType is defined as follows:

```
        typedef enum _tDataType
        {
            eNoTypOds,
            eByteOds,
            eI16Ods,
            eI32Ods,
            eI64Ods,
            eR32Ods,
            eR64Ods,
            eTimeOds,
            eStringOds,
            eInstOds,
            eBlobOds,
            eChannelOds
        }   tDataType;
```

The descriptions of the return values are listed in the status code table above.

| UDSA StatusMessageGet | | |
|---|---|---|
| long UDSA_StatusMessageGet | ( long<br>char** | lStatusNumber,<br>pszStatusMsg) |

Returns the applicable text message given a status/error number.

| lStatusNumber | : Status/error number |
|---|---|
| pszStatusMsg | : Text message |

The memory for pszStatusMsg will be allocated by this function and must be released by the calling program using the UDSA_ValuesFree function (UDSA_ValuesFree (eStringOds, 1, pszStatusMsg)).

The descriptions of the return values are listed in the status code table above.

| UDSA SourceBrowse | | |
|---|---|---|
| long UDSA_SourceBrowse | ( const char*<br>const char*<br>const char*<br>long*<br>char**<br>HWND<br>long | szDialogTitle,<br>szConfiguration,<br>szIniFile,<br>lInstCount,<br>pszInstKeys,<br>hwndParent,<br>lSourceHandle) |

Starts an instance browser dialog to select one or more instances in a data source.

| szDialogTitle | : Dialog title |
|---|---|
| szConfiguration | : Configuration file name |
| szIniFile | : Parameter file name |
| lInstCount | : Number of selected instances |
| pszInstKeys | : List of instance keys |
| hwndParent | : Parent window handle |
| lSourceHandle | : Data source handle |

The title of the dialog is specified in szDialogTitle.

The instance browser configuration file is specified in szConfiguration. If for the name of the configuration file either the string CREATE_MEASUREMENT or CREATE_MEAQUANTITY is specified, then a configuration will be generated which enables the selection of measurement or measurement quantities respectively.

To store and use user-defined settings for the dialog (size of the dialog, column width, etc.), an INI file name can be specified in szIniFile to store this information. If a registry entry "REGISTRY=<RegKey>" is specified for the INI file name, the settings will be stored in the registry under the key <RegKey >.

In pszInstKeys the instance keys of the selected instances will be returned as a multiple null-terminated string. The memory for pszInstKeys will be allocated by this function and must be released by the calling program using the UDSA_ValuesFree function (UDSA_ValuesFree(eInstOds, lInstCount, pszInstKeys)).

The dialog will be opened as a child window of the parent window specified in hwndparent, or as a dialog window relative to the desktop if no parent is specified (hwndParent=NULL).

The descriptions of the return values are listed in the status code table above.

The CITADEL Database

The Citadel database is designed for storage and retrieval of large amounts of data. Citadel stores real-time numeric and logical data in a compressed format. Software that uses Citadel to log its data has access to a database engine ("engine") that knows the location of the database and is able to receive and process live data from the application. The engine then proceeds to store the data in Citadel based on pre-configured characteristics such as percentage of change in the data, pre-configured alarms and events, and so on.

A particular characteristic of this database's most common implementations is that it only stores data when a given data point (a.k.a. channel or tag) changes its value. This contrasts with the way relational databases commonly store data, which is usually based on a preset time interval.

Citadel stores information through traces. The term "trace" refers to the line of data continuity for a specific point or channel. A trace connects all the values for a given point, which displays as a continuous line within the trend viewing utility. If the logging software is unexpectedly interrupted or a data member is temporarily modified to suspend logging to disk, a trace can be broken. If this occurs, the trace is plotted as a continuous line with void sections to represent gaps in the database. New traces can be added to the database by configuring a new point.

The logged data accurately reflects the behavior of the point or channel, because even though an unchanged value of a point is not recorded repeatedly as time progresses, it does store the difference in change (delta) from an initial reference point. This method effectively maximizes the usage of space in the storage device (hard drive).

Consider the following use case: There is a valve in a plant, the state of which a user wants to log over an indefinite amount of time. Assume that the position of the valve does not change frequently, but only under certain circumstances; for example when a tank needs to be cleaned.

The state of the valve may be logged as a binary number (0 or 1) where "0" indicates valve closed and "1" indicates valve open. Assume this data is being logged to two databases simultaneously—an interval-based database where data is logged every hour and a change-based database such as Citadel. Consider this scenario: logging is started, the valve remains open for 1 year and then closes, at which point the logging ceases. At this point, the interval-based database will have logged 8760 entries, whereas the Citadel database will have logged only two. Assuming the data uses the same disk space in both databases, Citadel would use 2.2% of the space required by the other method. Granted, this depends on the frequency at which the signal changes. However, this demonstrates that a storage algorithm can have a major impact on how much data can be saved or archived.

Due to the large amounts of data that various systems can produce, one of the most important features and requirements for a database of this nature is space conservation, a concept related to data compression. Citadel's clients only log data points that change by a pre-determined percentage of the full range from the previously logged point. This means that if a data point logged (t0), does not change by more than a given threshold until x units of time have gone by, the next logged point will be at t(x). In one embodiment, the data may be logged as a delta ($\Delta$) to the previously logged point. Therefore, if the reference for a trace is 100 for t0, and the signal changes to 120 for t3, the actual value stored would be +20.

In addition, only that channel (trace/thread) is updated, independently of all others. This allows for an extra level of efficiency by not updating all channels every time an event occurs.

Tables vs. Traces

A relational database can be thought of as a series of fields or cells that store information in a given location in memory or storage device. Large amounts of information contained in these cells relative to the data contained in other cells or fields can be retrieved. The layout of the data can be compared to a spreadsheet file or table.

A database contaning traces or threads, such as Citadel, could be conceptualized as follows with these data values:

Trace1:$(t_0,v_0)$=0.223,$(t_1,v_1)$=+0.001,$(t_2,v_2)$=+0.001,
$(t_5,v_5)$=+0.001 . . .

Trace2:$(t_0,v_0)$=1,$(t_1,v_1)$=+1,$(t_2,v_2)$=+1 . . .

Trace3:$(t_0,v_0)$=87,$(t_1,v_1)$=−22,$(t_2,v_2)$=−11,$(t_3,v_3)$=−32,
$(t_4,v_4)$=+12 . . .

Citadel does not store the actual value of a point at $t_x$, but rather the difference (delta) to the previous value $t_{(x-1)}$ One particular advantage of storing deltas is that they can be expressed with fewer bytes than a wholly refreshed number. Every time there is an interruption in the acquisition or a new acquisition (and thus, a new trace) is started, a new reference gets recorded. It is important to remember that some values may not be logged if the user chooses to enable filtering capabilities. The database and the client application cannot make this decision for the user, so filtering capabilities are completely configurable.

Typical Applications

A database such as Citadel may typically be used to log large amounts of data over long periods of time. Under such circumstances, disk space and logging frequency are important factors to consider. For certain applications in which large amounts of data is to be stored, where the data has a relationship with other data within the same database and useful correlations or enhanced search capabilities need to be provided, a relational database may be better suited.

Another possibility is a combined use of the two databases. For example, one could use the Citadel database to log data from acquired points or channels, and a relational database to keep track of channel names and properties, relationships between points and processes or serial numbers, and other parameters that might help manage large numbers of channels.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

We claim:

1. A method for storing a measurement, the method comprising:
   receiving bulk data associated with the measurement;
   receiving one or more attribute values associated with the measurement, wherein the one or more attribute values associated with the measurement specify one or more of:
   a date for when the bulk data was acquired;
   a time for when the bulk data was acquired;

a name of a person controlling acquisition of the bulk data;
a serial number of a unit under test; and
an engineering unit with which the bulk data was acquired;
storing the bulk data in a first data store; and
storing the one or more attribute values in a second data store;
wherein the first data store is a different type of data store than the second data store.

2. The method of claim 1,
wherein the first data store comprises a database specialized for storing bulk data.

3. The method of claim 1,
wherein the first data store provides compressed real-time storage of the bulk data.

4. The method of claim 1,
wherein the first data store comprises one or more files.

5. The method of claim 1,
wherein the second data store comprises a relational database.

6. The method of claim 1,
wherein said storing the one or more attribute values in the second data store comprises storing the one or more attribute values as a row in a table of a relational database.

7. The method of claim 6,
wherein the table includes a first column for storing links to bulk data;
wherein the method further comprises storing a value in the first column for the row to link the one or more attribute values associated with the measurement to the bulk data associated with the measurement.

8. The method of claim 1,
wherein the measurement is structured according to a data model;
wherein said receiving bulk data associated with the measurement comprises receiving bulk data defined by the data model;
wherein said receiving one or more attribute values associated with the measurement comprises receiving values for one or more attributes defined by the data model.

9. The method of claim 8, further comprising:
storing the data model.

10. The method of claim 9,
wherein said storing the data model comprises storing the data model in one of the first data store or the second data store.

11. The method of claim 9,
wherein said storing the data model comprises storing the data model in a third data store;
wherein the third data store is different than the first data store and the second data store.

12. The method of claim 1,
wherein said receiving bulk data associated with the measurement comprises receiving data acquired from one or more hardware devices.

13. The method of claim 1,
wherein the bulk data comprises waveform data.

14. The method of claim 1,
wherein the measurement is a first measurement;
wherein the method further comprises:
receiving bulk data associated with a second measurement;
receiving one or more attribute values associated with the second measurement;
storing the bulk data in a third data store; and
storing the one or more attribute values in the second data store;
wherein the third data store is a different type of data store than the second data store.

15. The method of claim 1,
wherein the measurement is a first measurement;
wherein the method further comprises:
receiving bulk data associated with a second measurement;
receiving one or more attribute values associated with the second measurement;
storing the bulk data in the first data store; and
storing the one or more attribute values in a third data store;
wherein the third data store is a different type of data store than the first data store.

16. The method of claim 1,
wherein said storing the bulk data comprises:
storing a first portion of the bulk data in a first data store; and
storing a second portion of the bulk data in a third data store;
wherein the first data store and the third data store are each a different type of data store than the second data store.

17. A method for storing data, the method comprising:
receiving the data, wherein a first portion of the data comprises attribute data and a second portion of the data comprises bulk data, wherein the attribute data comprise one or more attribute values specifying one or more of:
a date for when the bulk data was acquired;
a time for when the bulk data was acquired;
a name of a person controlling acquisition of the bulk data;
a serial number of a unit under test; and
an engineering unit with which the bulk data was acquired;
storing the second portion of the data comprising the bulk data in a first data store; and
storing the first portion of the data comprising the attribute data in a second data store;
wherein the first data store is a different type of data store than the second data store.

18. The method of claim 17,
wherein said storing the second portion of the data and storing the first portion of the data comprises storing the second portion of the data and storing the first portion of the data such that the attribute data is associated with the bulk data.

19. The method of claim 17,
wherein the first data store comprises a database specialized for storing bulk data.

20. The method of claim 17,
wherein the first data store provides compressed real-time storage of the bulk data.

21. The method of claim 17,
wherein the second data store comprises a relational database.

22. The method of claim 17,
wherein the data is structured according to a data model;
wherein the bulk data is defined by the data model;
wherein the attribute data is defined by the data model.

23. The method of claim 22, further comprising:
storing the data model.

24. The method of claim 17,
wherein the data comprises measurement data.

25. The method of claim 17,
wherein the bulk data comprises one or more of:
waveform data;
trace data;
data representing a user interface element;
a blob (Binary Large OBject);
audio data;
video data.

26. A system comprising:
a storage for measurement data, wherein the measurement data comprises bulk data and attribute data,
wherein the attribute data comprises one or more attribute values associated with the measurement specifying one or more of:
a date for when the bulk data was acquired;
a time for when the bulk data was acquired;
a name of a person controlling acquisition of the bulk data;
a serial number of a unit under test; and
an engineering unit with which the bulk data was acquired; and
wherein the storage comprises:
a relational storage for storing the attribute data; and
a compressed real-time storage for storing the bulk data; and
an interface to the storage, wherein the interface is operable to retrieve one or more units of the bulk data and the attribute data based on a search query submitted to the interface.

* * * * *